United States Patent [19]

Horike et al.

[11] 4,395,717

[45] Jul. 26, 1983

[54] INK JET RECORDING APPARATUS

[75] Inventors: Masanori Horike; Yutaka Ebi, both of Tokyo, Japan

[73] Assignee: Ricoh Company, Ltd., Tokyo, Japan

[21] Appl. No.: 239,278

[22] Filed: Mar. 2, 1981

[30] Foreign Application Priority Data

Mar. 7, 1980 [JP] Japan .................................. 55-28780
Mar. 7, 1980 [JP] Japan .................................. 55-28781

[51] Int. Cl.$^3$ ............................................. G01D 18/00
[52] U.S. Cl. ...................................................... 346/75
[58] Field of Search .................. 346/75, 140 R, 140 IJ

[56] References Cited

U.S. PATENT DOCUMENTS 3,886,564 5/1975 Naylor et al. ........................ 346/75
4,060,813 11/1977 Yamada et al. ...................... 346/75
4,238,804 12/1980 Warren ................................ 346/75
4,281,332 7/1981 Horike ................................. 346/75
4,288,797 9/1981 Horike et al. ........................ 346/75

*Primary Examiner*—A. D. Pellinen
*Assistant Examiner*—W. J. Brady
*Attorney, Agent, or Firm*—David G. Alexander

[57] ABSTRACT

Considering the fact that a charging voltage and the resultant amount of deflection of an ink droplet are substantially proportional to each other, actual measurement is first made of a charging voltage for causing ink droplets to fly to at least one predetermined deflection position and then, based on the measured voltage, proper charging voltages for driving ink droplets to other deflection positions are computed. Further, more adequate charging voltages are determined taking nozzle compensatory coefficients allotted to individual ink ejection holes of nozzles and/or step compensatory coefficients for individual deflection steps into consideration.

17 Claims, 13 Drawing Figures

| Fig. 2c-1 | Fig. 2c-2 | Fig. 2c-3 |
|---|---|---|

INK JET RECORDING APPARATUS

BACKGROUND OF THE INVENTION

The present invention relates to a deflection control ink jet recording apparatus which ejects ink under pressure from a nozzle, applies vibration to the ejected ink to form ink droplets regularly, develops selectively a charging electric field according to an image signal when each ink droplet shapes itself, charges the ink droplets by the electric field, and deflects the charged ink ink droplet by a deflecting electric field. More particularly, the present invention is concerned with a device associated with a deflection control ink jet recording apparatus of the type having a linear arrangement of numerous ink ejection holes in order to determine proper levels of charging voltage.

Known ink jet recording apparatus of the type described may be classified generally into a two-value deflection control apparatus, a multi-value deflection control apparatus and a combined apparatus of the two mentioned. In the first or two-value apparatus, ink droplets for printing data are charged (or charged to a high level) while those which are not used for printing are left non-charged (or charged to a low level or to the opposite polarity) so that the recording droplets may be deflected to a large extent by a deflecting electric field to impinge on a recording sheet and the non-recording droplets may be captured by a gutter. Conversely, the non-recording ink may be deflected to a large extent to be captured by a gutter. In this type of apparatus, one nozzle is used for one picture element during the recording operation. In the second or multi-value apparatus, one nozzle is used for three or more picture elements (e.g. 5 mm and 40 dots, assuming 8 dots/mm) and recording droplets of ink are charged to three or more levels (e.g. 40 levels) to be deflected along three or more paths (e.g. 40 paths). In the third or combined apparatus, recording ink droplets are charged in the same way as in the multi-value process. However, this last-mentioned apparatus first deflects recording charged droplets using a deflecting electric field extending in the Y-axis direction so as to cause them to miss a gutter and then deflects them using another electric field in the X-axis direction in accordance with their charging levels, thereby printing out data in the X direction on a recording sheet with positional variations.

Meanwhile, ink to be ejected from a nozzle may be vibrated by any of three known systems: one which imparts pressure oscillation to the ink proper, one which imparts vibration in an intended direction of ink ejection to a nozzle plate having at least one ink ejection hole, and one which applies vibration bodily to an ink ejection head in an intended direction of ink ejection. The first system permits the use of a single nozzle plate having one ejection hole which is bonded to the leading end of a cylindrical electrostrictive vibrator, the other end of which is communicated with a pressurized ink supply box. It also permits the use of a nozzle plate having numerous ink ejection holes which is bonded to the front wall of a pressurized ink supply box in such a manner as to cover a slit provided to said wall of the ink supply box. One or more flat electrostrictive vibrators are mounted on one side wall of the box to impart vibrating pressure to ink inside the box. The second system employs a multi-apertured nozzle plate rigidly mounted to a pressurized ink supply box through an elastic member which is caused to vibrate by an electrostrictive vibrator. The third system drives a head bodily for oscillation by means of a motor, a solenoid device, an electrostrictive vibrator or the like.

A deflection control ink jet recording apparatus of any of the systems stated places a recording sheet at a relatively large spacing from its nozzle plate. For this reason, ink is pressurized to a level high enough for a droplet of ink from the nozzle to reach the recording sheet stably along a predetermined path despite its passage through the charging and deflecting electrodes. In order that ink droplets of a given diameter may appear regularly and follow their predetermined paths accurately, there must be stabilized and exactly controlled a variety of factors including the viscosity and pressure of ink, vibrating pressure, amount of charge and intensity of deflecting electric field. It is impossible, however, to hold all of such quantities under fully ideal conditions. This particularly results misalignment of actual deflection paths from reference deflection paths in the case of the multi-value deflection control which charges ink ejected from a single ejection hole to several different levels and drives them to different positions on a recording sheet.

Generally, an amount of deflection $x_{di}$ of ink droplets can be expressed as:

$$x_{di} = K \cdot \frac{Q_i \cdot v_{dp}}{m_j \cdot S_{dp} \cdot v_j^2} \quad \text{Eq. (1)}$$

where K denotes a constant which depends on the deflecting electrodes, $Q_i$ an amount of charge of the ink droplets, $m_j$ a mass of the ink droplets, $v_{dp}$ a deflecting voltage, $S_{dp}$ a spacing between opposite deflecting electrodes and $v_j$ an ejection velocity of the ink droplets.

An amount of charge $Q_i$ can be expressed as:

$$Q_i = k \cdot V_{ci} \quad \text{Eq. (2)}$$

where k indicates a value dependent on the shape of the electrode, shape of the ink column, dielectric constant etc. It will be seen from the Eqs. (1) and (2) that the amount of deflection $X_{di}$ and then charging voltage $V_{ci}$ are proportional to each other and expressed by $X_{di} \propto V_{ci}$. Stated another way, they hold a linear relation therebetween which can be represented by a straight line which passes through the origin of a graph.

The specific relation mentioned between the amount of deflection and the charging voltage forms the foundation of the present invention.

SUMMARY OF THE INVENTION

In accordance with a first embodiment of the present invention, a charging voltage $V_{cs}$ necessary for ink droplets to reach at least one position $X_{ds}$ on a sheet is measured actually and, from $X_{ds}$ and $V_{cs}$, the proportional constant K of an equation $X_{ds} = K \cdot V_{ds}$ is determined. Then charging voltages $V_{ci}$ adequate to drive ink droplets to the other positions $X_{di}$ on the sheet are obtained using the equation $V_{ci} = K \cdot X_{di}$ with the coefficient K determined.

As has been pointed out, it sometimes occurs in a practical ink jet head that a small amount of charge is deposited on ink droplets despite the absence of a charging voltage according to the shape of ink ejection holes and various parameters such as ink pressure and ink temperature. In this case, there holds a relation $V_{ci} = -K \cdot X_{di} + A$ and the value A is therefore determined by the factors stated above. In accordance with a second embodiment of the present invention, the value A is determined first and then charging voltages $V_{ci}$ are obtained using the equation $V_{ci}=K\cdot X_{di}+A$ as in the first embodiment.

A third embodiment of the present invention is applicable to a case wherein the value A mentioned varies from time to time. In this embodiment, actual measurement is made of a charging voltage $V_{cs1}$ necessary to drive ink droplets to a preselected position $X_{ds1}$ on a sheet and a charging voltage $V_{cs2}$ for driving ink droplets to a second position $X_{ds2}$. Then the values K and A in the equation $V_{ci}=K\cdot X_{di}+A$ are determined from the voltages $V_{cs1}$ and $V_{cs2}$ and thereupon charging voltages $V_{ci}$ are determined by the equation $V_{ci}=K\cdot X_{di}+A$.

In accordance with a fourth embodiment of the present invention, consideration is given to nozzle compensatory coefficients $A_i$ allotted to the ink ejection holes of individual nozzles. Proper charging voltages are determined by multiplying the compensatory coefficients $A_i$ by the charging voltages $V_{ci}$ determined in the foregoing embodiments, $A_i\cdot V_{ci}$, and through an equation $A_i\cdot V_{ci}=A_i\cdot KX_{di}$ (first embodiment) or $A_i\cdot V_{ci}=A_i(KX_{di}+A)$ by way of example.

Furthermore, actual measurement showed that streams of air produced by flying droplets of ink as well as other factors create a small difference in flying velocity from a droplet directed to one position on a sheet to a droplet directed to another. This is reflected by a somewhat non-linear relationship between the position $X_{di}$ and charging voltage $V_{ci}$. The deviation becomes particularly prominent when the intended number of deflection steps is large. Thus, the relation between the position $X_{di}$ and voltage $V_{ci}$ can be represented by a quadratic curve or a hyperbola in a graph. In accordance with a fifth embodiment of the present invention, step compensatory coefficients $B_i$ dependent on individual positions $X_{di}$ are taken into consideration. Proper charging voltages are determined by multiplying the step compensatory coefficients $B_i$ by the charging voltage $V_{ci}$ obtained in the foregoing embodiments, $B_i\cdot V_{ci}$ and through an equation $B_i\cdot V_{ci}=B_i(KX_{di}+A)$ (second embodiment) by way of example. The step compensatory coefficient $B_i$ may be obtained by actually measuring two charging voltages $V_{cs1}$ and $V_{cs2}$ with or without a third charging voltage $V_{cs3}$ also measured and thereby computing the constant of an equation of a quadratic curve or that of a hyperboia. Alternatively, a charging voltage $V_{dk}$ obtainable by a theoretical equation at each deflection step and a charging voltage $V_{dkB}$ to be actually applied may be processed in an equation $V_{dk}=B_i\cdot V_{dkB}$ so as to determine its proportional constant which is the step compensatory coefficient $B_i$.

It is therefore an object of the present invention to provide charge voltage setting means for a deflection control ink jet recording apparatus which means determines an optimum charging voltage for ink droplet from nozzle to be properly deflected by a deflecting electric field.

It is another object of the present invention to provide a generally improved ink jet recording apparatus.

Other object, together with the foregoing, are attained in the embodiments described in the following description and illustrated in the accompanying drawings.

DESCRIPTION OF THE PREFERRED EMBODIMENTS

While the ink jet recording apparatus of the present invention is susceptible of numerous physical embodiments, depending upon the environment and requirements of use, substantial numbers of the herein shown and described embodiments have been made, tested and used, and all have performed in an eminently satisfactory manner.

An amount of deflection or a deflection to a predetermined position can be detected by either one of two known systems: one which employs a pair of static induction type charge detecting electrodes located to face each other through a determined deflection path and detects an amount of deflection based on a difference between their output signals, and the other which directly detects impingement of charged ink droplets by one, two or three electrodes. Particular reference will be made to the second-mentioned system in the description given hereinafter.

Figure 1A:
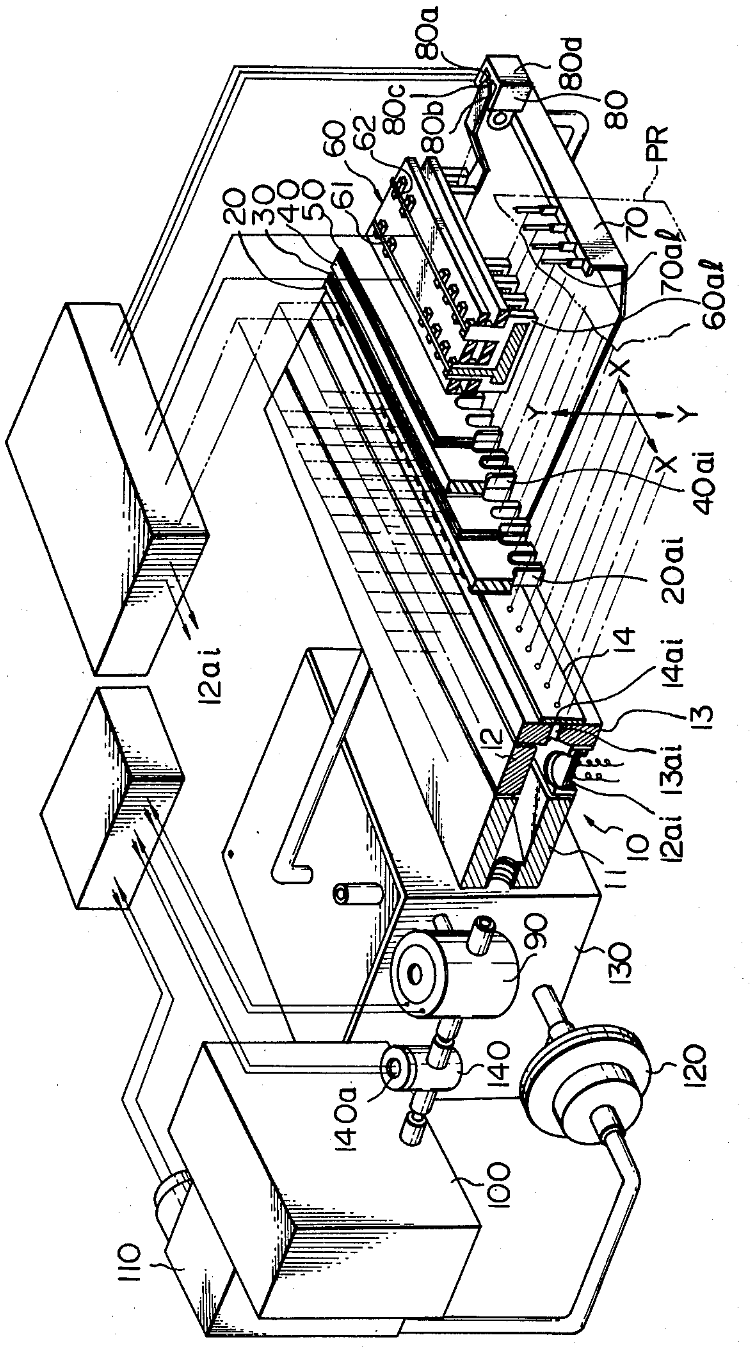
FIG. 1*a* shows in perspective form the mechanical arrangement of an ink jet recording apparatus embodying the present invention.
Figures 1, 1B:
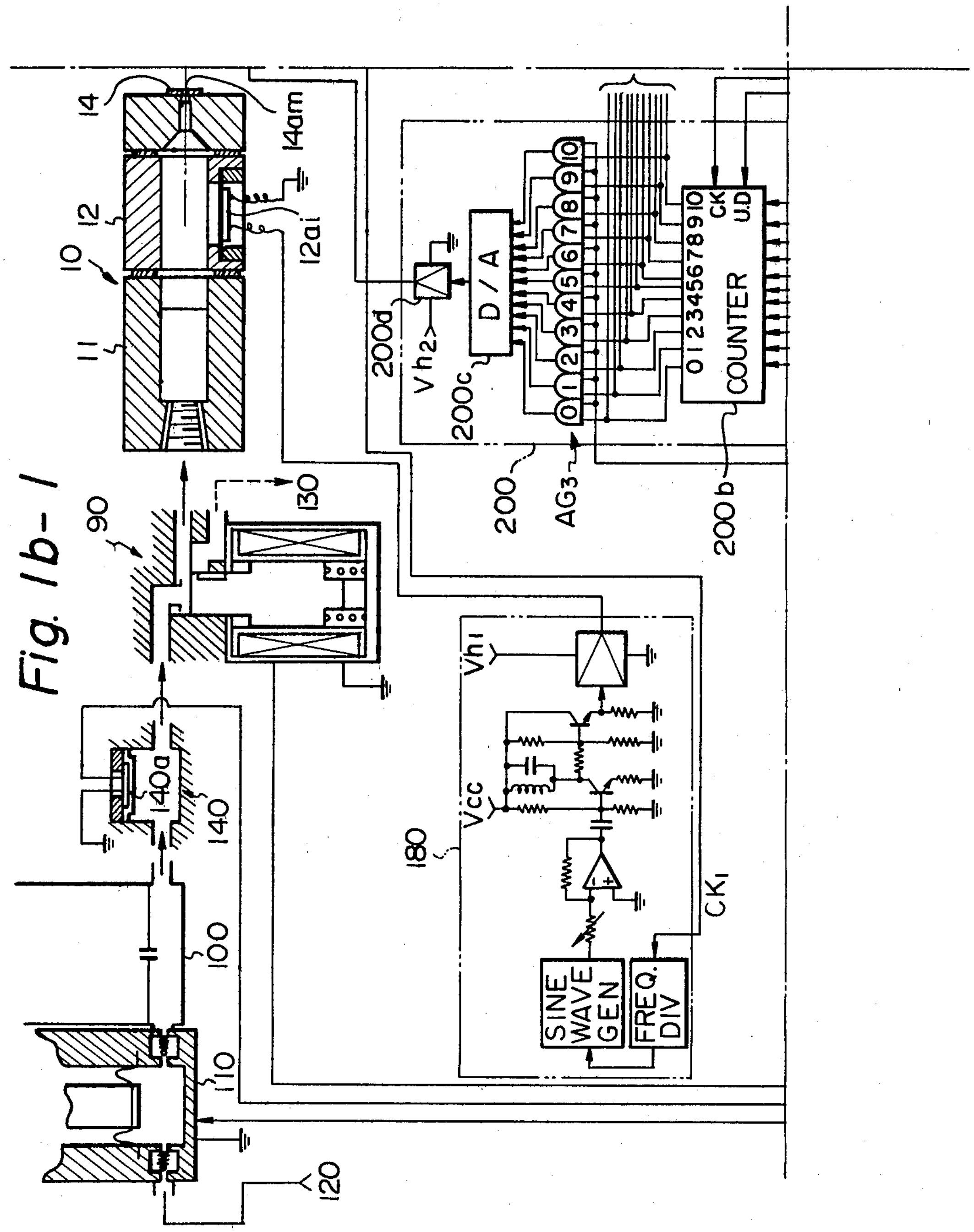
FIGS. 1*b* and 1*c* are block diagrams indicating an electric circuit arrangement associated with the mechanical arrangement shown in FIG. 1*a;*
Figure 1C:
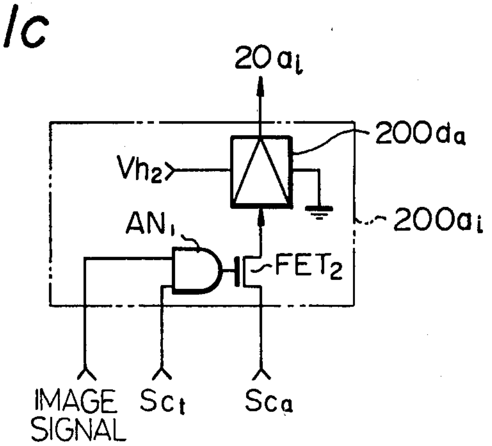

Referring to FIG. 1*a* of the drawing, there is shown the mechanical arrangement of a multi-nozzle type multi-value deflection ink jet recording apparatus to which the present invention is applicable. FIGS. 1*b* and 1*c* show major electric arrangements of the ink jet recording apparatus individually. The mechanical arrangement includes an ink ejection head 10 which is generally made up of a member 11 defining a common ink passage therein, a vibrator support frame 12 defining a drive space therein and nozzle plate holder 13. The support 12 carries a plurality of electrostrictive vibrators 12$a_i$ rigidly on its bottom wall. When the vibrators 12$a_i$ are driven synchronously with a constant frequency, pressurized ink within the space of the support 12 will be applied with pressure oscillation of a determined frequency. The nozzle plate holder 13 is formed with a plurality of ink passageways 13$a_i$ at common intervals (e.g. 5 mm) throughout its recording width, the passageways 13$a_i$ communicating with the internal space of the support 12. A nozzle plate 14 is bonded to a surface of the holder 13 and provided with microscopic holes 14$a_i$ at locations spaced the same distance as the ink passageways $13a_i$. The nozzle plate 14 has forty-two such holes $14a_i$ for ink ejection arranged at a common interval of 5 mm, so that one ejection head can record through the width of 42×5 mm=210 mm. Besides these holes $14a_i$, the nozzle plate 14 has an additional hole at a position outside the recording area to eject droplets of ink therefrom in the same way as from the outer holes.

A charging electrode plate 20 is located in front of the nozzle plate 14 with respect to the intended direction of ink ejection from the latter. In front of the electrode plate 20, there is positioned a charge detecting electrode plate 40 via the intermediary of a shield plate 30. A deflecting electrode unit 60 is positioned in front of the electrode plate 40 via a second shield plate 50. A gutter 70 is positioned in front of the electrode unit 60. The electrode plates 20 and 40 and shield plates 30 and 50 have aligned inverted U-shaped recesses which are common in number to the holes $14a_i$ of the nozzle plate 14. The electrode plates 20 and 40 individually have printed electrodes $20a_i$ and $40a_i$ on the inner surfaces of their inverted U-shaped recesses. Each of these electrodes $20a_i$ and $40a_i$ extends out individually along the surface of the electrode $20a_i$ or $40a_i$. The deflecting electrode unit 60 has a plurality of deflecting electrode plates $60a_l$ each of which is deposited with deflecting electrodes by evaporation on the front and back surfaces thereof. The deflecting electrodes on each electrode plate $60a_l$ are individually connected to first and second conductive wires 61 and 62 respectively.

The gutter 70 has upright capturing members or catches $70a_l$ at spaced locations where droplets of ink ejected from the holes $14a_i$ of the nozzle plate 14 and left non-charged (at a non-recording level) reach as indicated by dot-and-dash lines in FIG. 1*a*. While the catches $70a_l$ are shown in the illustrated embodiment to have one-to-one positioned correspondence with the holes $14a_i$ of the nozzle plate for ejecting recording droplets, an electrode unit 80 for detecting deflection position is located within a range which ink droplets from a monitoring ejection hole $14a_m$ of the nozzle plate 14 will reach (outside the recording sheet area). The charging electrodes $20a_i$ are supplied with a staircase voltage waveform which may have forty stepwise or incremental variable levels, in accordance with image signals. Where a scan line is to be recorded or printed on a recording sheet for example, the 1st to 40th levels of voltage pulses will be coupled to the charging electrodes $20a_i$ in correspondence with the forty ink droplets ejected from the individual holes of the nozzle plate so as to charge the ink droplets to the 1st to 40th levels. These charged ink droplets will then be deflected by electric fields across the deflecting electrodes 60 from a high voltage power supply 230 and impinge on the recording sheet by way of the 1st to 40th deflecting paths and spacings between the catches $70a_l$. Thus, one ink ejection hole $14a_i$ is used to print forty dots along the array of the catches $70a_l$ (this direction will hereinafter be referred to as a horizontal scan or X—X direction). A recording sheet designated PR in the drawing is moved continuously or intermittently in a direction Y—Y which is perpendicular to the direction X—X mentioned. Since the application of charging voltages is controlled in accordance with image signals and since the recording sheet PR is fed in the manner stated, data will be recorded on the recording sheet PR in both the X—X and Y—Y directions in the form of dots.

An accumulator 100 supplies the head 10 with pressurized ink through an electromagnetic valve 90 and is in turn supplied with ink under pressure from an ink reservoir 130 through a filter 120. Ink captured by the gutter 70 is routed back to the reservoir 130. The fluid passage between the accumulator 100 and valve 90 has a member 140 which defines a fluid chamber 140 therein and carries a semiconductive strain gauge 140*a* sealingly therewith. The valve 90 has a first or inlet port communicated with the member 140, a second or outlet port communicated with the member 11, and a third port communicated with the interior of the ink reservoir 130.

The valve 90 is of the type having a plunger (not shown) which will recede when the coil of the valve is energized so as to provide communication between the inlet and outlet ports while blocking the third port. When the coil is deenergized, the plunger of the valve 90 will be advanced by the action of a coil spring to a position where it closes the inlet port and communicates the outlet port with the third port. The reference numeral 110 denotes a pump which comprises a single electric coil (not shown), a plunger in the form of a polarized permanent magnet, a diaphragm and a spring-biased ball valve. The electric coil will be supplied with a current alternately in opposite directions such that the plunger is driven for reciprocation to suck and discharge ink alternately. The amount of ink delivery from the pump 110 depends on the switching frequency of the current supply thereto as well as the value of the current.

The electrode unit 80 includes a pair of charge detecting electrodes 80*b* and 80*c* which define at one end an opening wide enough to catch all the ink droplets from the monitoring ejection hole whatever the amount of deflection may be and, at the other end, a slit permitting only those droplets passed through a specific path to get therethrough. The specific path is in the embodiment a reference path of ink droplets which, concerning the 40 step charging, have been charged to the highest or 40th level of charge. The electrode unit 80 also includes a third charge detecting electrode 80*a* on which ink droplets passed through the slit between the electrodes 80*b* and 80*c* will impinge. These three electrodes 80*a*, 80*b* and 80*c* are held integrally by a support 80*d* but electrically insulated from each other thereby.

Reference will be made to FIG. 1*b* for describing a fluid control section adapted to perform on-off fluid control and pressure control and a print control section for the search of charging phases and deflection amount control.

A fluid control section comprises a valve driver (amplifier) 150, a pressure setting circuit 160 and a pump drive and control circuit 170. When the central controller 240 supplies the valve driver 150 with a valve open command (for communicating input and output ports of the valve and energizing the coil) as its "1" level output, the coil of the valve 90 is supplied with a predetermined level of current to open the valve. The pressure setting circuit 160 is made up of a standard code setter 160*a*, an up-down counter 160*b* and a digital-to-analog converter 160*c*. The standard code setter 160*a* which is of the fixed or semi-fixed type is loaded with a code corresponding to the standard ink pressure.

When one count pulse arrives at the up-down counter 160*b* which has been supplied with an upcount command "1" or a downcount command "0", the counter 160*b* produces a code indicative of a number given by adding "1 (one)" to the output code of the standard code setter 160*a*. The counter 160*b* holds said code unless a count pulse arrives thereat. The output code of the counter **160*b* is processed by the digital-to-analog converter 160*c* into an analog signal and passed therefrom to the pump drive and control circuit 170**.

Besides this analog signal from the converter **160*c* indicating a set pressure, the pump drive and control circuit 170 is supplied with an analog signal from the semiconductive strain gauge 140*a*. This analog output of the strain gauge 140*a* is high or low in level when the pressure of ink is high or low respectively. In the circuit 170, the voltage at the strain gauge 140*a* is inverted and amplified by an operational amplifier $OPA_1$ while the analog signal from the digital-to-analog converter 160*c* is inverted and amplified by another operational amplifier $OPA_2$. Output of these operational amplifiers $OPA_1$ and $OPA_2$ are commonly coupled to a differential amplifier DAM. Supposing that the operational amplifier $OPA_1$ is producing an output voltage $v_1$ (inversely proportional to the ink pressure) which is $v_1 \geqq 0$ and the operational amplifier $OPA_2$ an output voltage $v_2$ (inversely proportional to the set pressure) which is $v_2 \geqq 0$, the differential amplifier DAM produces an output voltage $V_3$ which is $V_3 = K(v_1 - V_2)$. Therefore, the output voltage $V_3$ of the differential amplifier DAM will become lower as the actual ink pressure rises and as the designated pressure level drops while becoming higher as the actual ink pressure drops and as the designated pressure level rises. Only at a certain predetermined level of the voltage $V_3$, a switch SW in the form of a relay or a switching semiconductive element for instance is closed to supply the inverting input terminal of a third operational amplifier $OPA_3$ with a 50 Hz sinusoidal wave which constitutes a pump drive signal. Suppose here that the voltage $V_2$ appearing from the operational amplifier $OPA_2$ is constant. Then the output voltage $V_3$ of the differential amplifier DAM is proportional to the output voltage $V_1$ of the operational amplifier $OPA_1$ and therefore inversely proportional to the ink pressure. The switch SW closes when the ink pressure is lower than a predetermined level and opens when it rises beyond the predetermined level, the pump 110 being driven only when the switch SW is open. In this way, the ink pressure is controlled to a predetermined constant level. The pressure designating signal $V_2$ is applied to the differential amplifier DAM as a reference signal for the above-mentioned constant voltage control and which shifts in inversely proportional relation with the designated pressure level. Accordingly, the ink pressure will be controlled to a first constant pressure $P_0$ in response to a given designated pressure level $V_0$, to a second constant pressure $P_h$ ($>P_0$) in response to a designated pressure level $V_h$ higher than the level $V_0$, and to a third constant pressure $P_l$ ($<P_0$) in response to a designated pressure level $V_l$ lower than the level $V_0$. While the switch SW is in its closed state, transistors $Tr_1$ and $Tr_2$ are alternately turned on in synchronism with the positive and negative half-waves of the 50 Hz sinusoidal wave whereby the coil of the pump 110 is alternately and repeatedly energized in opposite directions. That is, it is only when the switch SW is closed that the pump 100 is activated. As an alternative technique for the ink pressure control, the pump 110** may have its energizing frequency, pulse duration and/or current level controlled in accordance with the output level of the differential amplifier DAM.

The reference numeral 180 designates a driving voltage generator serving to drive the electrostrictive vibrators **12*ai*. The central control device 240 supplies the drive voltage generator 180 with clock pulses $CK_1$. The drive voltage generator 180 subjects the input clock pulses $CK_1$ to $\frac{1}{4}$ frequency division and prepares a sinusoidal wave one cycle of which corresponds to two divided pulses. The sinusoidal wave is amplified within the drive voltage generator 180 and coupled therefrom to the electrostrictive vibrators **12*ai*. One ink droplets shapes itself out of the ink column for each cycle of the sinusoidal wave. That is, one ink droplet appears for each eight clock pulses.

A phase setting circuit 190 of the print control section includes a counter **190*a* which is supplied with clock pulses $CK_1$. The counter 190*a* is a ring counter that upcounts the clock pulses $CK_1$ to "8" and counts "9" as "0". More specifically, while clock pulses $CK_1$ are arriving in succession, the counter 190*a* counts them as "0", "1", "2", . . . , "8", "0", "1", "2", . . . , "8", "0", "1", "2" . . . . Output codes of this counter 190*a* are coupled to a decoder 190*b* . Accordingly, each time a clock pulse $CK_1$ arrives at the counter 190*a*, the decoder 190*b* shifts its high level or "1" output successively at its output terminals 0–7. Consequently, the individual output terminals 0–7 of the decoder 190*b* produce phase search pulses which have a common phase difference corresponding to the period $T_1$ of the clock pulses $CK_1$ relative to each other and have a duration of $T_1$ which is $\frac{1}{8}$ of a period $T_8$ of ink droplet production. These eight sets of phase search pulses are supplied to individual AND gates 0–7 of a first AND gate group AG and also to paired OR gates 0–7 of an OR gate group $OG_1$, respectively. Outputs of the OR gates of the OR gate group $OG_1$ are fed to AND gates 0–7 of a second AND gate group $AG_2$. As will be described, during a phase search, all of the AND gates of the second group $AG_2$ are closed and a selected one of the AND gates of the first group $AG_1$ is opened whereby a specific one of the phase search pulses or outputs at 0–7 of the decoder 190*b* is passed through an output OR gate $OR_1$ to a monitoring charge signal generator 200 which will be described hereinafter. Which one of the AND gates of the first group $AG_1$ is to be opened depends on the output of a second decoder 190*c* which is supplied with count codes of a second counter 190*d*. Clearing and upcounting of the second counter 190*d* are controlled by a central controller or central control device or unit 240. For a phase searching operation, the central control device 240 first clears the counter 190*d* so that the signal level at the output terminal 0 of the decoder 190*c* becomes high or "1". This opens the AND gate 0 of the first group $AG_1$ to deliver a phase search pulse appearing at the output terminal 0 of the decoder 190*b* to the monitor charge signal generator 200. For the duration of this phase search pulse, the charge signal generator 200 applies a charging voltage to a monitor charging electrode 20*am*. Observing the output of a charge detection circuit 210 which is connected to a monitor charge detecting electrode **40*am*, the central control device 240 supplies the counter **190*d* with one pulse if the output level of the charge detector 210 has not become "1" indicative of "charged" in a predetermined period of time after the clearing of the counter 190*d*. Then the signal level at the next output terminal 1 of the decoder 190*c* becomes "1" whereby the AND gate 0 of the first group $AG_1$ is closed and the AND gate 1 is opened to pass the second set of phase search pulses or input pulses at the terminal 1 of the decoder 190*b* to the charge signal generator 200 through the OR gate $OR_1$. It will be seen here that the pulses thus coupled to the charge signal generator 200 have a phase delay of $T_1$ relative to the preceding set of phase search pulses. Again, the central control device 240 observes the output level of the charge detector 210 and keeps on feeding pulses to the counter 190***d* until the output level becomes "1", causing the counter 190*d* to count up. When a "1" output indicative of "charged" is supplied from the charge detector 210 to the central controller 240, the latter supplies no more pulses to the counter 190*b* since an optimum charging phase has been determined. Then the central controller 240 supplies all of the AND gates 0–7 of the second group $AG_2$ with ON or "1" signals therefrom. Supposing that the count at the counter 190*d* existing at that instant is "3", the signal level at the output terminal 2 of the decoder 190*c* is "1" opening the AND gate 2 of the first group $AG_1$ and the AND gate 2 of the second group $AG_2$. A third set of phase search pulses are therefore supplied from the AND gate 2 of the group $OG_1$ to the OR gate $OR_1$ while an output of the OR gate 2 of the group $OG_1$ which is the combination of phase search pulses of the second and fourth sets is coupled to the OR gate $OR_1$. Stated another way, if it is the third set of phase search pulses that corresponds to the optimum charging phase, the OR gate $OR_1$ supplies the charge signal generator 200 with a print charge pulse which is the sum (logical sum) of a pulse of the third set and those of the second and fourth sets on opposite sides of the third set, or a pulse having the search setting pulse at its center and lasting a duration of $3T_1$ which is three times as long as the duration of said pulse. Making the duration of phase search pulses short and that of print charge pulses long functions to detect a charging phase accurately through phase search and ensure positive charging for printing. It will be noted in FIG. 1*b* that the mechanical arrangement is shown with the monitoring ink ejection hole $\mathbf{14}a_m$ at the center and with the monitoring charging electrode $\mathbf{20}a_m$ and onward in sectional plan view.

As already described, the monitor charge electrode $\mathbf{20}a_m$ is supplied with a charging voltage from the charging signal generator 200 as long as an output print charge pulse ("1" level) of the phase setting circuit 190 lasts. The charge signal generator 200 comprises a standard code setter 200*a* loaded with a standard charging voltage code of the maximum deflection level (lowest value of the charging voltage of the maximum deflection level), an up-down counter 200*b*, eleven AND gates 0–10 constituting a third AND gate group $AG_3$, a digital-to-analog converter 200*c* and a voltage amplifier 200*d*. Up- and down-counting actions of the counter 200*b* are controlled by the central control device 240. All of the AND gates of the third group $AG_3$ remain opened while a print charge pulse appears.

It will be recalled that the electrode unit 80 comprises two combined electrodes 80*b* and 80*c* and the electrode 80*a*. The position of the electrodes 80*b* and 80*c* is such that the slip gap therebetween aligns with a path which ink droplets charged by the monitoring electrode $\mathbf{20}a_m$ supplied with a reference charging voltage are to follow. Ink droplets got through the slit gap will impinge on the electrode 80*a* which is so located. Deflection detectors 220*a*–220*c* are connected with the electrodes 80*a*, 80*b* and 80*c*, respectively.

The deflection detector 220*a* is made up of an integrating MOS FET (metal oxide silicone field effect transistor) $FET_1$, a capacitor C, an operational amplifier $OPA_4$, a comparator $COM_1$, a reed relay LR and a relay driver (amplifier) LD. When the relay driver LD of the deflection detector 220*a* is energized for a moment, the relay LR is temporarily closed causing the capacitor C to discharge or release its charge (resetting). Thereafter, when charged ink droplets come to impinge on the electrode 80*a*, the capacitor C is charged little by little upon impingement of each ink droplet and this charge voltage is converted into a voltage by the $FET_1$ and coupled to an operational amplifier $OPA_4$. The amplifier $OPA_4$ then amplifies the input voltage and applies its output to the comparator $COM_1$. A reference voltage Vref which is also coupled to the comparator $COM_1$ is in this embodiment set at a value lower than an output voltage of the operational amplifier $OPA_4$ which will appear after 256 droplets of ink carrying a standard charge impinge on the electrode 80*a*. Accordingly, by checking the output level of the circuit 220*a* upon appearance of 256 ink droplets after the temporary closing of the relay LR, the ink droplets can be determined as flying the determined deflection path if the output level is "1" indicating "charge detected". The other deflection detectors 220*b* and 220*c* are constructed in the same way as the deflection detector 220*a*. Ink droplets flying a path of short deflection would impinge on the electrode 80*b* whereas those flying a path of excessive deflection would impinge on the electrode 80*c*. Therefore, deflected positions of ink droplets can be determined by checking the outputs of the deflection detectors 220*a*–220*c* after closing the relays LR of the deflection detectors for a moment subsequently to the aforementioned phase searching operation and when the number of the clock pulses $CK_1$ counted up has reached $256\times8=2048$ for instance, that is, then 256 ink droplets have appeared. If the output of the detector 220*a* is "1", the deflection is adequate; if the output of the detector 220*b* is "1", the deflection is short; and if the output of the detector 220*c* is "1", the deflection is excessive. Seeing a "1" output at the detector 220*b*, the central controller 240 conditions the counter 200*b* of the monitor charge signal generator for an upcount mode and supplies it with one pulse. Seeing a "1" output at the detector 220*c*, the central controller 240 conditions the counter 200*b* for a downcount mode and couples one pulse thereto. Then the central controller 240 temporarily closes the relays OR and resets the detectors 220*a*–220*c* to re-start counting clock pulses $CK_1$. Upon counting up a determined number of clock pulses $CK_1$, the central controller 240 again checks the output levels of the detectors 220*a*–220*c*. Thereafter, the central controller 240 repeatedly causes the counter 200*b* to upcount or downcount until the detector 220*a* produces a "1" output and, in this way, adjusts the charging voltage level. The count code output of the counter 200*b* which will appear when the output of the detector 220*a* has become "1" indicates a charging voltage necessary to direct ink droplets to a predetermined maximum deflected position, i.e. the 40th step of the charging voltage.

As will be described, the central controller 240 based on the charge voltage code determines the 1st to 40th steps of charge voltages and delivers them sequentially from the first step to the 40th step at the period of $T_0=8T_1$ in timed relation with the production of ink droplets. Upon delivery of the 40th charge voltage code, the central controller 240 repeats the delivery of the same series of charge voltage codes starting from the 1st step. The charge voltage codes are processed by a digital-to-analog converter 250 into analog signals and passed to individual print charge signal generators

200$a_i$ connected with the individual charging electrodes 20$a_i$ which are associated with the printing ink ejection holes 14$a_i$ of the nozzle plate 14 within the recording width of the latter.

Figure 1D:
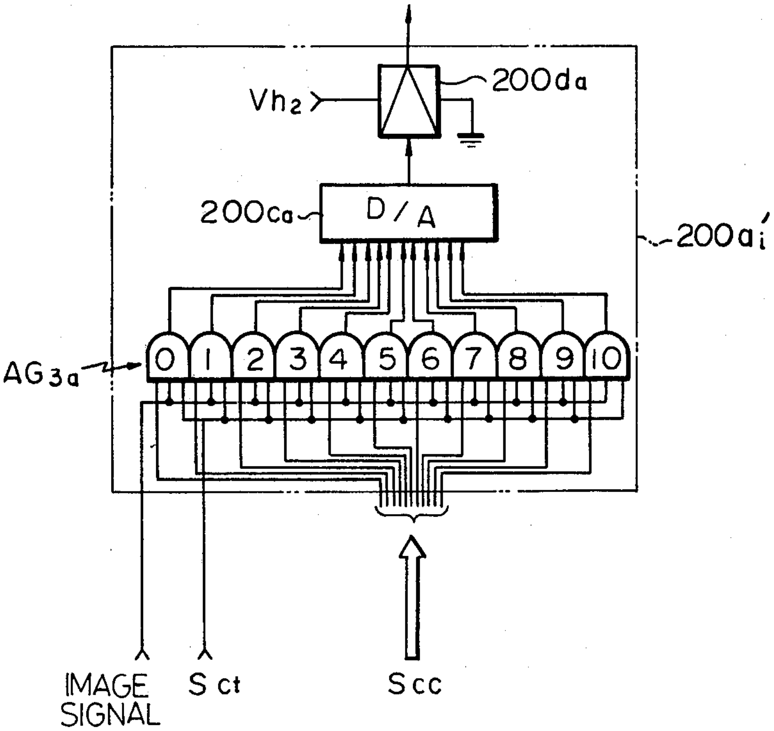
FIG. 1*d* is a block diagram showing a modification of a printing charge signal generator.
Figures 1, 1B, 2:
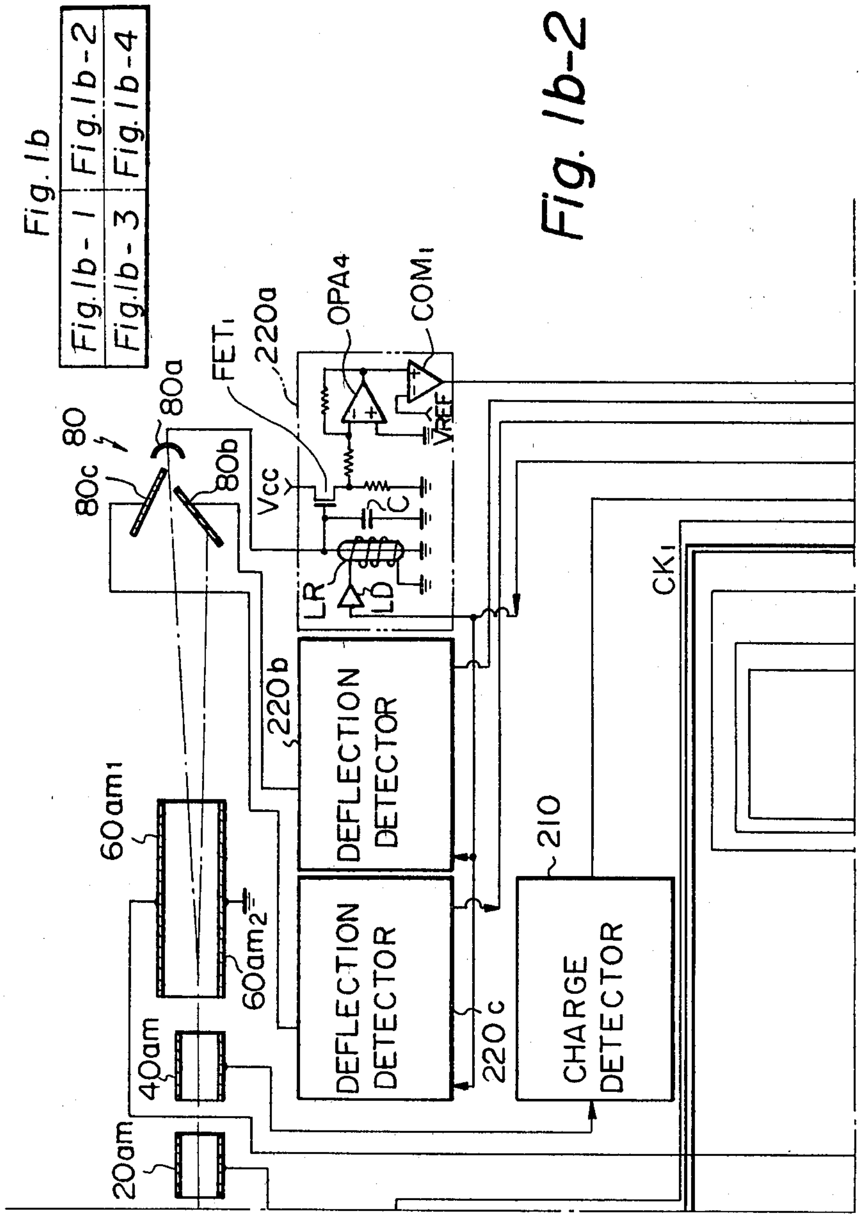

Each of print charge signal generators 200$a_i$ has a construction depicted in FIG. 1*c*. The number of the generators 200$a_i$ installed in the apparatus is the same as that of the charging electrodes 20$a_1$ for printing. The generators 200$a_i$ are commonly supplied with output analog signals from the digital-to-analog converter 250. In the charge signal generator shown in FIG. 1*c*, an output of the digital-to-analog converter 250 is coupled to a MOS FET designated as $FET_2$ in the drawing. This $FET_2$ receives an output of an AND gate $AN_1$ at its gate and supplies its output to a voltage amplifier 200$d_a$ whose output is in turn coupled to a charging electrode 20$a_i$. Applied to two input terminals of the AND gate $AN_1$ are a print charge pulse $S_{ct}$ which is an output of the phase setter 190 and an image signal (having a "1" level indicative of recording and a "0" level indicative of non-recording). Only when the image signal level is "1", a print charge pulse $S_{ct}$ is supplied to the voltage amplifier 200$d_a$ which then applies a charging voltage to the electrode 20$a_i$. It will be noted that, where the central controller 240 is to supply the charge voltage generators 200$a_i$ for printing with charge voltage codes $S_{cc}$, each of charge voltage generators 200$a_i'$ may be furnished with AND gates of a third AND gate group $AG_{3a}$ and a digital-to-analog converter 200$_{ca}$ in the same way as the monitor charge voltage generator 200 as indicated in FIG. 1*d* of the drawings.

In adjusting and setting an amount of deflection as described, the central controller 240 compares a count code output of the counter 200*b* with an upper limit and a lower limit defining a certain range therebetween before causing the counter to upcount or downcount. If the count at the counter 200*b* is equal to the upper limit or the lower limit, the central controller 240 resets the counter 200*b* and loads it with a standard code while getting the counter 160*b* of the pressure setting circuit 160 into a downcount mode and coupling one pulse thereto so as to alter the reference pressure. After a time period long enough for the actual ink pressure to vary, the phase search described will be performed and then the detection and adjustment of the amount of deflection.

Concerning the central control device 240, it comprises a central processing unit or CPU which may be constituted by a microprocessor, a semiconductive read-only memory or ROM, a semiconductive random access memory or RAM and a microcomputer of one or several chips having input/output ports (not shown). The read-only memory ROM stores therein program data for practicing the aforementioned various control, constant data which will be referred to for such programs, and other additional program and constant data. The central controller 240 controls printing operation in cooperation with an image signal processing control unit (not shown) on the image signal delivery side of the apparatus. Reference will now be made to the flowcharts shown in FIG. 2*a*–2*f* for describing a part of the operation of the central controller 240 which is directly concerned with practicing the present invention.

The random access memory RAM of the central controller 240 has predetermined regions for temporary storage. These specific regions will be referred to as registers for convenience and, in relation with the flowcharts, they store contents shown in Tables 1 and 2.

Furthermore, the read-only memory of the central controller 240 stores step compensatory coefficients $B_i$ of the 1st deflection step to the 40th deflection step. Regions storing such data will be referred to as step compensatory memories 9–48 and shown in Table 3.

TABLE 1

| MEMORY REGION | | READ/WRITE MEMORY DATA IN RAM CONTENT |
|---|---|---|
| TIMER 1 REGISTER | | count of CK1 for counting time |
| TIMER 2 REGISTER | | " |
| COUNTER 1 REGISTER | | " |
| COUNTER 2 REGISTER | | number of formed ink droplets (for deflection detection) |
| TIMER 3 REGISTER | | count of CK1 for counting time |
| CHARGE VOLT REGISTER 9 | Scc | charge voltage Vc1 actually applied to 20ai for 1st deflection position |
| CHARGE VOLT REGISTER 10 | Scc | charge voltage Vc2 actually applied to 20ai for 2nd deflection position |
| CHARGE VOLT REGISTER 11 | Scc | charge voltage Vc3 actually applied to 20ai for 3rd deflection position |
| ⋮ | | ⋮ |
| CHARGE VOLT REGISTER 48 | Scc | charge voltage Vc40 actually applied to 20ai for 40th deflection position |
| COEFFICIENT REGISTER | | voltage Vcs/48 indicated by count code of counter 200b |
| COUNTER 4 REGISTER | | number of CK1 (for frequency division) |
| COUNTER 5 REGISTER | | number of formed ink droplets (for switching charge voltage) |

TABLE 2

| MEMORY REGION | READ/WRITE MEMORY DATA IN RAM CONTENT |
|---|---|
| TIMER 1 REGISTER | count of CK1 for counting time |
| TIMER 2 REGISTER | " |
| COUNTER 1 REGISTER | " |
| COUNTER 2 REGISTER | number of formed ink droplets (for deflection detection) |
| TIMER 3 REGISTER | count of CK1 for counting time |
| CHARGE VOLT REGISTER 9 | charge voltage B9Vc1 actually applied to 20ai for 1st deflection position |

TABLE 2-continued

| MEMORY REGION | | READ/WRITE MEMORY DATA IN RAM CONTENT |
|---|---|---|
| CHARGE VOLT REGISTER 10 | | charge voltage B10Vc2 actually applied to 20ai for 2nd deflection position |
| CHARGE VOLT REGISTER 11 | Scc | charge voltage BnVc3 actually applied to 20ai for 3rd deflection position |
| \| | | \| |
| CHARGE VOLT REGISTER 48 | | charge voltage B48Vc40 actually applied to 20ai for 40th deflection position |
| COEFFICIENT REGISTER | | voltage Vcs/48 indicated by count code of counter 200b |
| COUNTER 4 REGISTER | | number of CK1 (for frequency division) |
| COUNTER 5 REGISTER | | number of formed ink droplets (for switching charge voltage) |

TABLE 3

| MEMORY REGION | | STORED DATA | |
|---|---|---|---|
| STEP COM MEMORY | 9 | step com coefficient | B9 |
| " | 10 | " | B10 |
| " | 11 | " | B11 |
| " | ' | " | ' |
| " | ' | " | ' |
| " | ' | " | ' |
| " | 48 | " | B48 |

It will be noted that, assuming a point which ink droplets flown straight will reach as a zero deflection position, a range defined between a position 1 mm away from the zero deflection point and a position 6 mm away from the same accommodates 40 dots (8 dots per mm).

Figure 2A:
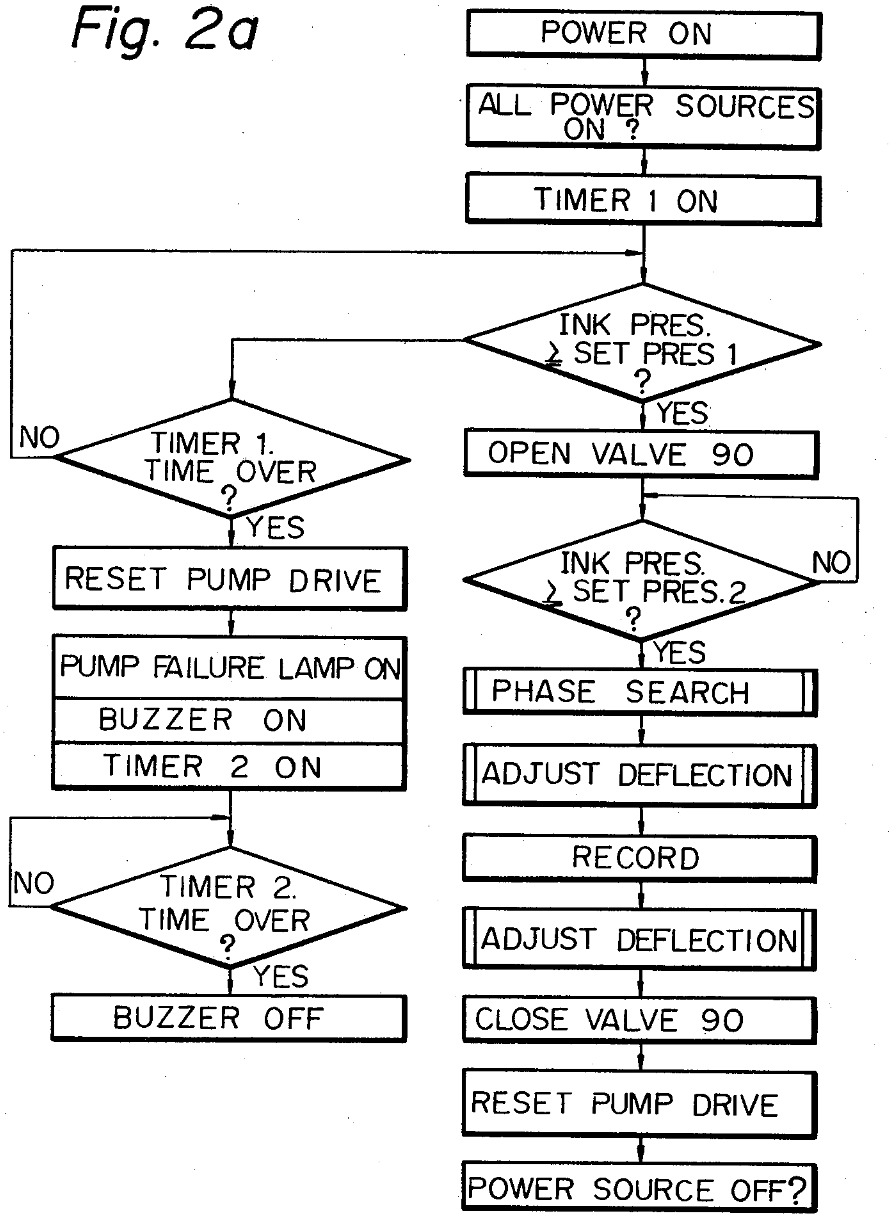
FIG. 2*a* is a flowchart outlining a control operation of a central control device from a step of power source application to the end of recording.

Referring now to FIG. 2*a*, the operation of the central control unit 240 will be outlined. When supplied with power itself, the central controller 240 turns on power sources of various instruments and circuits which it is to control (FIGS. 1*b* and 1*c*) in a predetermined sequence. The central controller 240 resets the counter 160*b* of the pressure setting circuit 160 and loads it with a standard code. This causes the pump driver 170 to activate the pump for establishing a standard ink pressure. After thus setting a target ink pressure at the standard level, the central controller 240 starts counting up the clock pulses $CK_1$. This is performed according to a count program which causes the controller to add "1" to the content of the timer 1 register every time a clock pulse $CK_1$ arrives and store the sum anew in the timer 1 register. During this action, the central controller 240 keeps on checking the output pressure of the semiconductive strain gauge 140*a*. When this pressure grows beyond the reference level 1, the central controller 240 activates the valve 90 to thereby provide communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "timer over", the buzzer is deenergized but the lamp is kept turned on. As already stated, then the ink pressure rises beyond the reference value 1 and the valve 90 is opened, ink will be ejected from the head 10 resulting in a temporary drop of the ink pressure. To cope with this, the central controller 240 waits until the ink pressure exceeds a second reference level 2 and then performs phase search which is followed by adjustment of the amount of deflection. After the adjustment of the deflection amount, the central controller 240 informs the image signal delivery side of the end of preparation for recording operation and demands the supply of image signals. The central controller 240 in this way performs its actions for reproducing images on the recording sheet. During printing operation, the central controller 240 carries out phase search and adjustment of deflection amount in response to phase search commands and deflection adjustment commands which will be applied thereto from the image signal delivery side. Upon completion of the printing operation, the central controller 240 in response to an end command from the image signal delivery side first deenergizes the valve 90 and then turns off the power source associated with the pump drive and control circuit and then turns off the power sources for the other units and circuits (FIGS. 1*a*, 1*b* and 1*c*). The power source associated with the controller 240 proper is turned on and off by the image signal delivery side.

Referring to FIGS. 2*b*–2*f*, there will be described in detail those operations of the central controller 240 for searching a phase, adjusting the amount of deflection and setting a charge voltage during printing action.

Figure 2B:
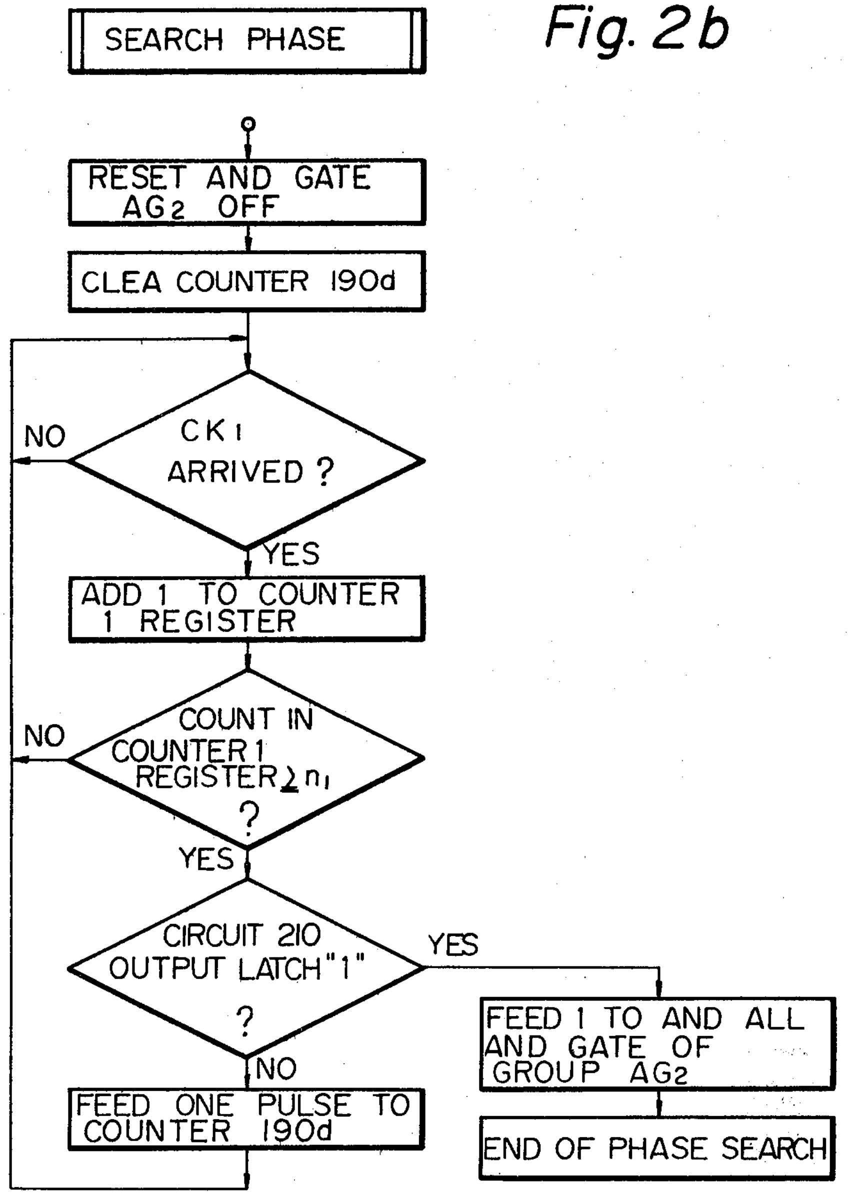
FIG. 2*b* is a flowchart demonstrating in detail the steps of phase searching and setting.

Concerning the phase searching procedure, the central controller 240 first closes all of the AND gates 0–7 of the second group $AG_2$ in the phase setter 190 (output latch reset of the controller 240) and clears the counter 190*d* as shown in FIG. 2*b*. In this situation only the AND gate 0 of the first group $AG_1$ remains opened so that only the first set of phase search pulses (appearing at the output terminal 0 of the decoder 190*b*) are coupled to the monitor charge signal generator 200. The controller 240, counting the clock pulses $CK_1$ (the counter 1 register storing the number of received clock pulses $CK_1$), checks whether the charge detector 210 has latched a "1" output when the count of the clock pulses increases beyond a predetermined number $n_1$, that is, after the formation of a predetermined number of ink droplets. If not "1", the controller 240 supplies one pulse to the counter 190*d*. At this instant, the decoder 190*c* switches the "1" level output from the output terminal 0 to the output terminal 1 whereby the AND gate 1 of the first group $AG_1$ is allowed to pass the second set of phase search pulses (output terminal 1 of the decoder 190*b*) therethrough to the monitor charge signal generator 200. Upon lapse of a predetermined period of time, the controller 240 refers to the output level of the charge detector 210 and, if it is "0", again supplies one pulse to the counter 190*d*. In this way, the phase search pulses applied to the monitor charge signal generator 200 are shifted by $T_i$ each within the droplet forming period $T_8=8T_1$ where $T_1$ is the period of the clock pulses $CK_1$. An output code of the counter 190*d* which appears when the output of the charge detector 210 becomes "1" meaning the "charged" state of the ink droplets indicates the phase search pulses which properly charge the ink droplets. After this phase search, the controller 240 opens all of the AND gates 0–7 of the second group $AG_2$ and latches them in this state. Then the OR gate $OR_1$ is allowed to produce print charge pulses each having a proper phase search pulse at the center and lasting a duration of $3T_1$ which is three times as long as that $T_1$ of the proper phase search pulse.

Figures 1, 2C:
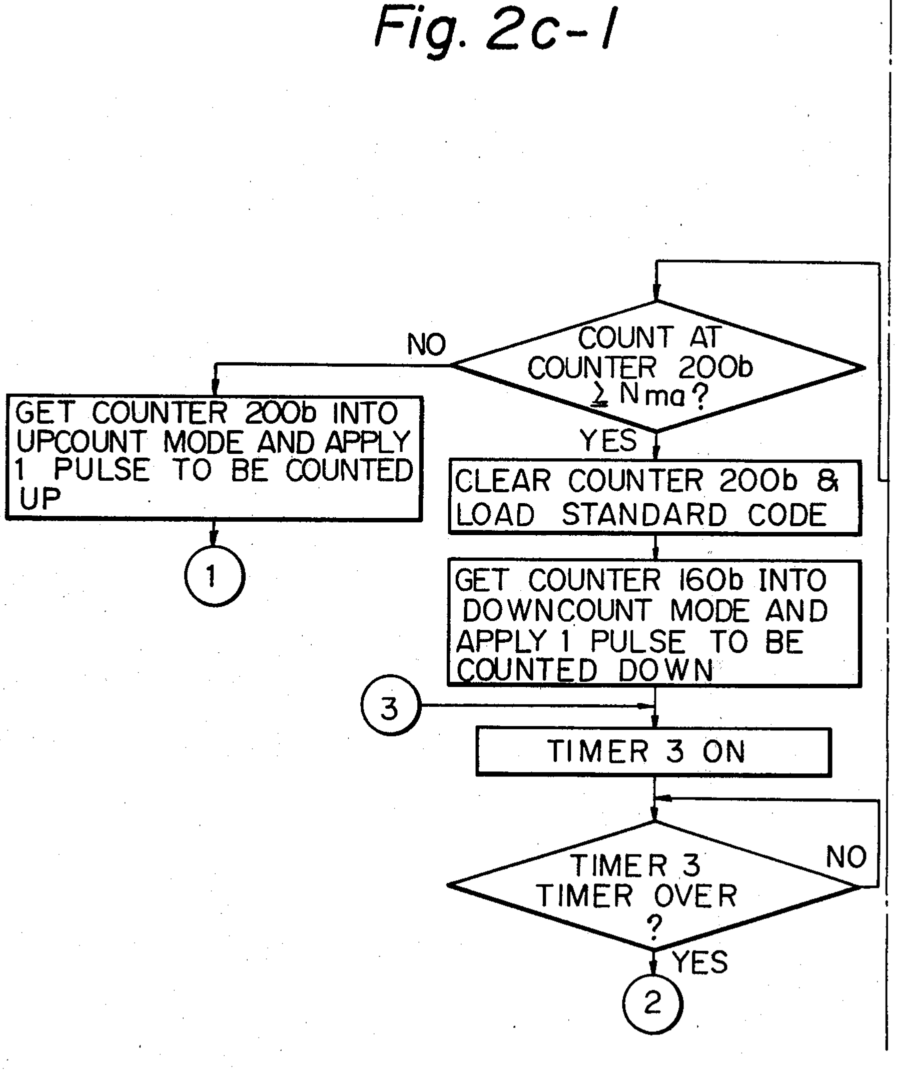
FIGS. 2*c*, 2*d* and 2*f* are flowcharts indicating the details of adjustment of deflection amount.
Figures 2, 2C:
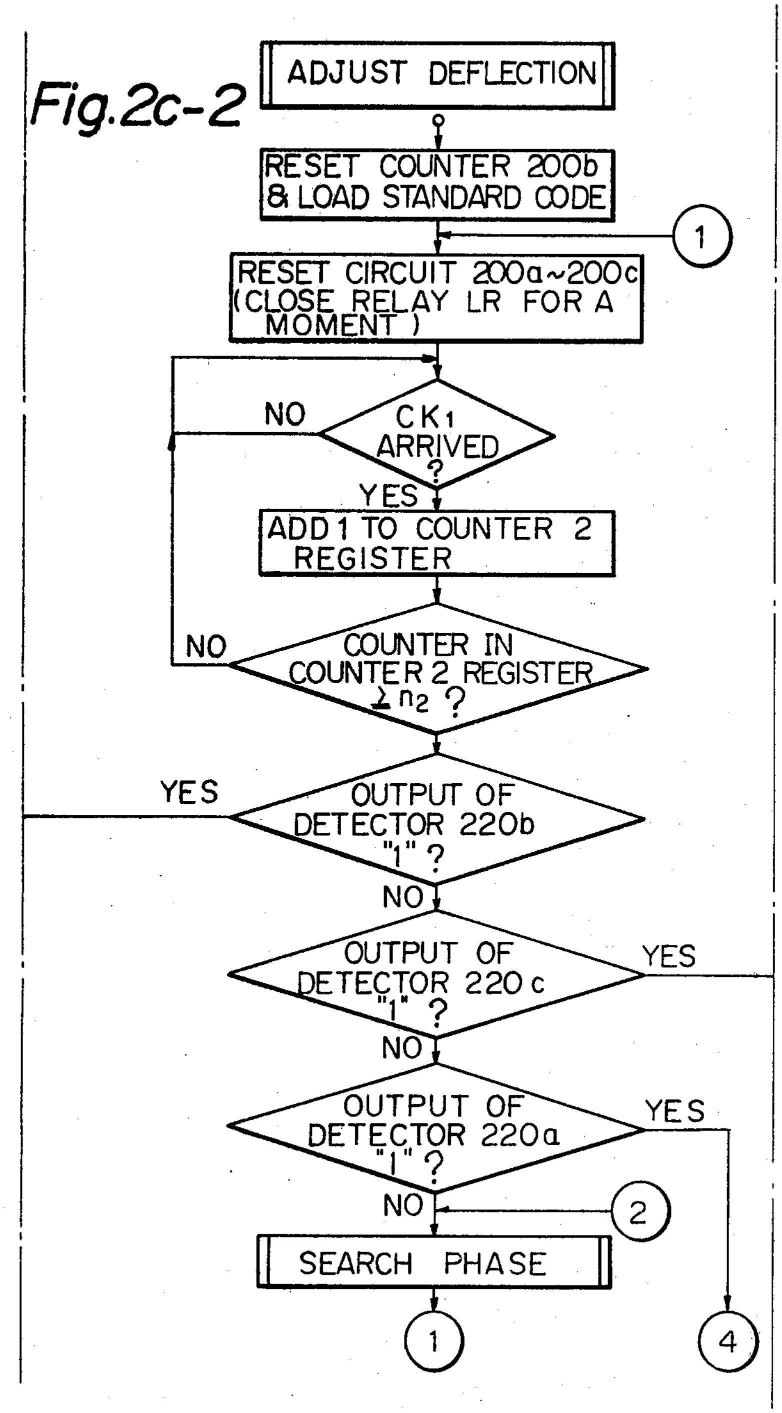
Figures 2, 2C, 3:
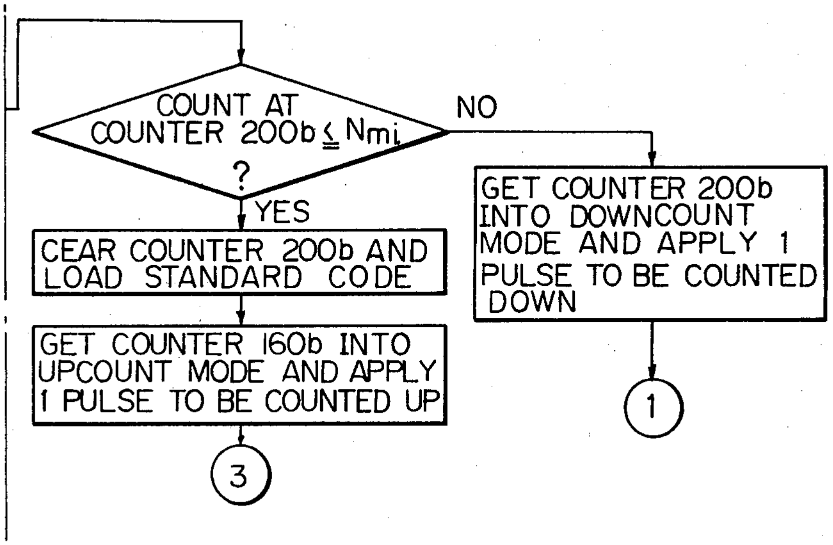
Figure 2D:
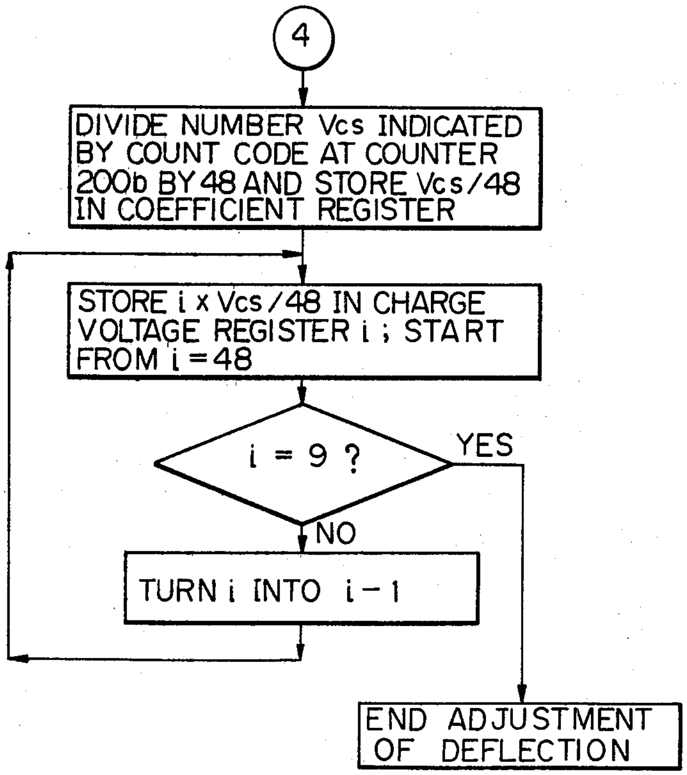
Figure 2E:
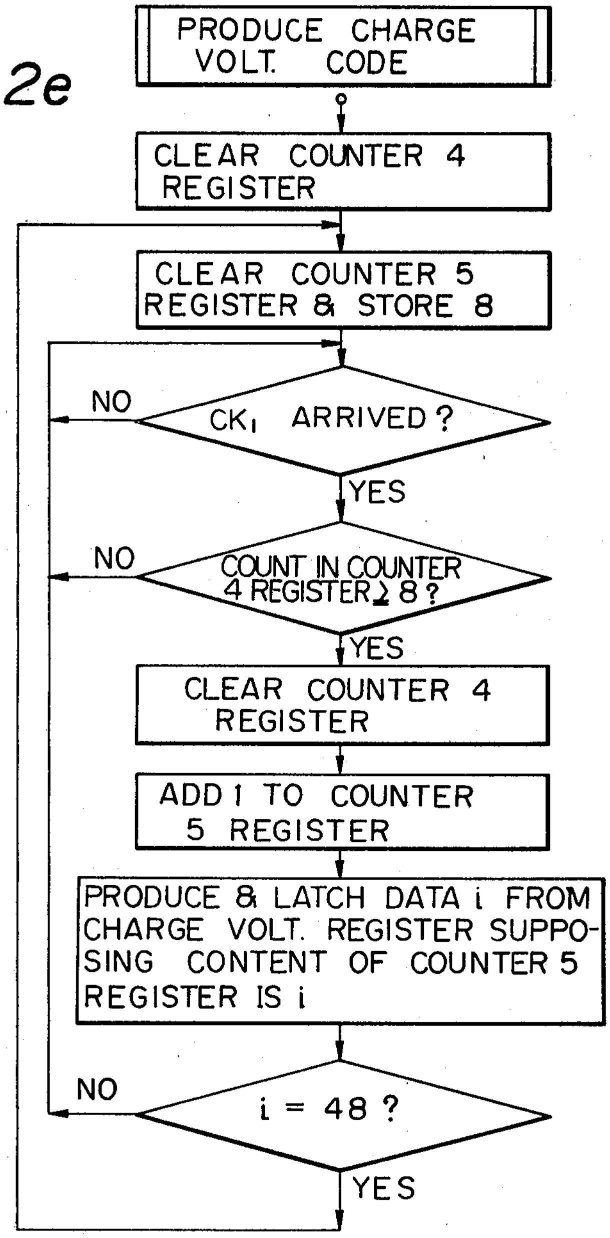
FIG. 2*e* is a flowchart indicative of a charge voltage code producing procedure for printing.
Figure 2F:
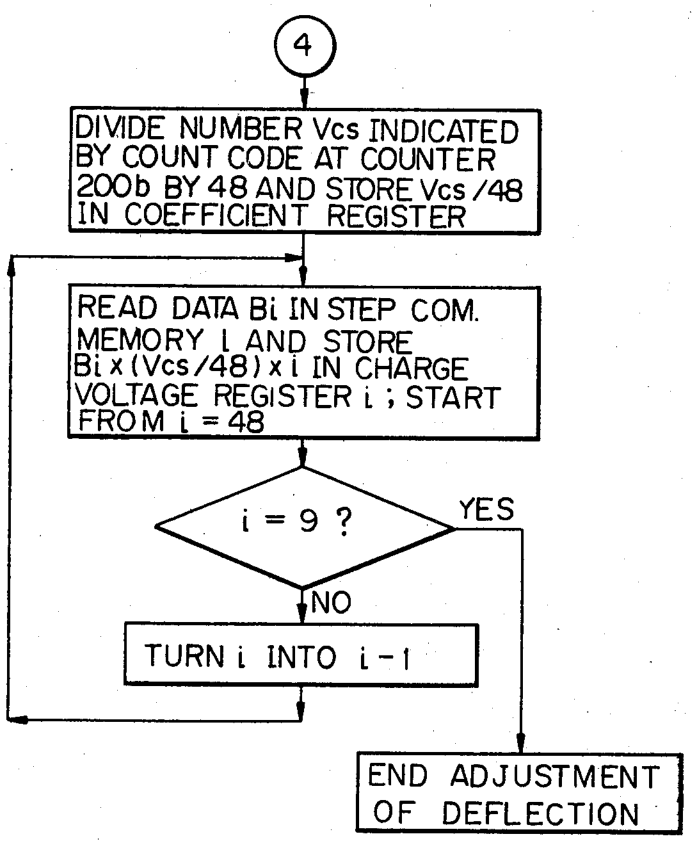
Figure 3:
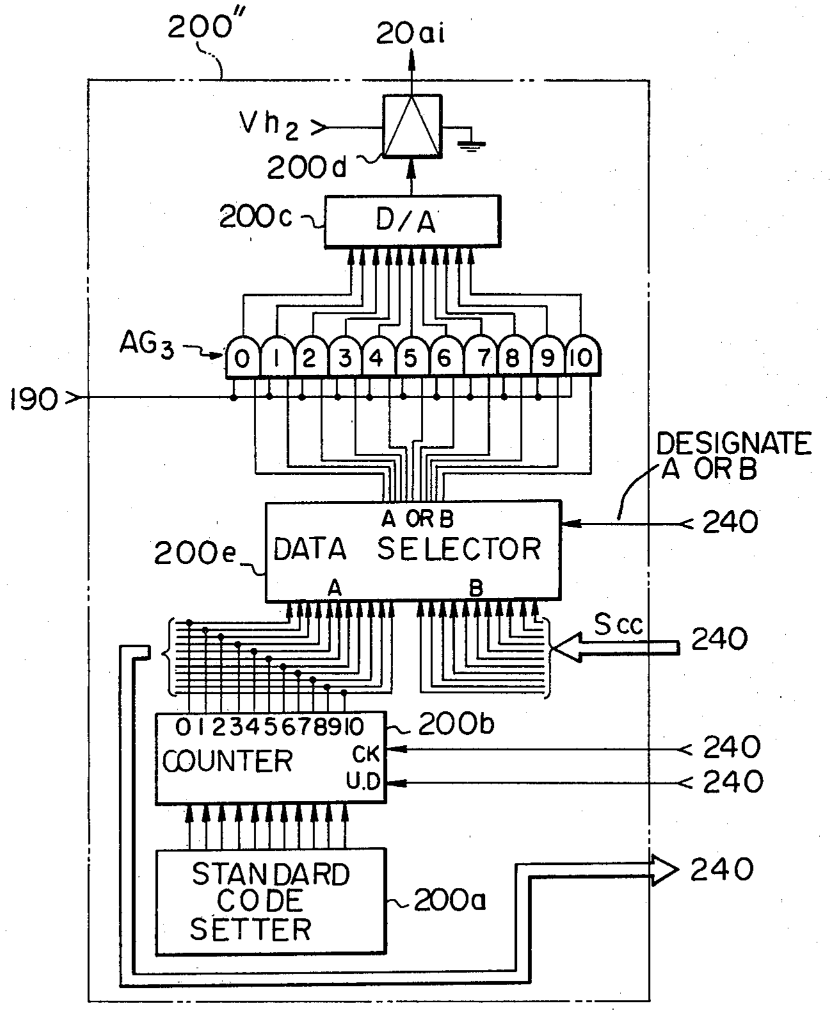
Figure 4:
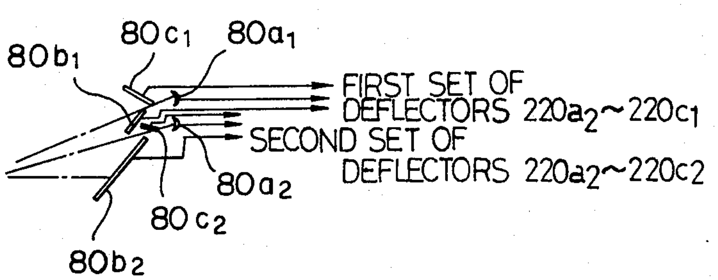

For the adjustment of the deflection amount, the central controller 240 operates as will be described with reference to FIGS. 2C, 2*d* and 2*f*. The controller 240 first resets the counter 200*b* and loads it with a standard code so that the 40th step of standard charge voltage is applied to the charging electrode 20*a*$_m$. The controller 240 then closes the reed relay LR of the deflection detectors 220*a*–220*c* for a moment to discharge the capacitor C and starts counting the ink droplets formed. As the count of the ink droplets exceeds a predetermined value, the central controller 240 checks the outputs of the deflection detectors 220*a*–220*c*. Finding a "1" output at the detector 220*b*, the central controller 240 judges the deflection short and causes the counter 200 to count "1" up. Prior to this action, the central controller 240 checks the output code of the counter 200*b* and, if it is larger than a predetermined value $N_{ma}$, clears the counter 200*b* determining that the charging voltage is outside the adjustable range and then loads it with a standard code so as to regain the standard charging voltage. The counter 160*b* is prepared for a count-down and supplied with a one pulse whereby the target ink pressure is reduced by one step. Then the timer 3 register is activated to start counting time. The central controller 240 performs another phase searching operation (FIG. 2*b*) at the instant the change in the target ink pressure has been reflected by a change in the ink pressure, that is, when the da a stored in the timer 3 register has increased beyond a predetermined number (timer 3 time over). After the phase search, the central controller 240 closes the relays LR of the detectors 220*a*–220*c* for a moment and checks the output levels of the detectors when the number of ink droplets it counted reaches a predetermined value.

When the central countroller 240 finds a "1" output at the deflection detector 220*c*, it judges the deflection amount excessive and applies one pulse to the counter 200*b* which will be caused to downcount this time. Before this action, the central controller 240 checks the count code at the counter 200*b* and, if it is less than a predetermined value $N_{mi}$, determines that the charging voltage level is outside the adjustable range. Then the central controller 240 clears the counter 200*b* and loads it with a standard code to regain the standard charging voltage whereupon it conditions the counter 160*b* for a count-up mode and applies by one pulse thereto for thereby incrementing the target ink pressure one step. The timer 3 register is activated to start counting time. When the change in the target ink pressure is reflected by a change in the ink pressure, that is, when the data in the timer 3 register increases beyond a reference value (timer 3 time over), the central controller 240 performs another phase searching operation (FIG. 2*b*). After this phase search, the relays LR of the deflection detectors 220*a*–220*c* are closed for a moment and the number of ink droplets formed is counted. As the counted number of ink droplets coincides with a predetermined value, the central controller 240 checks the output levels of the detectors 220*a*–220*c*. When the detector 220*a* produces a "1" output indicating an optimum amount of deflection, the central controller 240 computes the coefficient K by dividing the voltage $V_{cs}$ indicated by the output code of the counter 200*b* by "48" which is the 40th step deflected position (spaced 6 mm from the straightforward point and, thus, the 48th step as viewed from the straightforward point). The coefficient obtained is stored in the coefficient register. Thereafter, $48\times V_{cs}/48$ is stored in the charge voltage register 48 as a voltage $V_{c40}$, $47\times V_{cs}/48$ in the charge voltage register 47 as a voltage $V_{c39}$, $46\times V_{cs}/48$ in the charge voltage register 46 as a voltage $V_{c38}$ and, in the same way, other charge voltages in the other charge voltage registers. Finally, $9\times V_{cs}/48$ is stored in the charge voltage register 9 and this is the end of the deflection amount adjustment or charge voltage setting operation.

Another embodiment of the present invention which determines charge voltages taking the step compensatory coefficients $B_1$ into consideration is outlined in FIG. 2*f* while its details will be discussed later. When the output level of the deflection detector 220*a* becomes "1" indicating an optimum amount of deflection, the central controller 240 determines the coefficient K as illustrated in FIG. 2*d* by dividing the charge voltage represented by the count code of the counter 200*b* by "48" which is the 40th step deflected position (spaced 6 mm from the straightforward point and, thus the 48th step as viewed from said specific point). Then the central controller 240 reads $B_{48}$ from the step compensatory memory 48 and stores in the charge voltage register 48 $B_{48}\cdot V_{c40}=B_{48}\cdot(V_{cs}/48\times 48)=B_{48}\cdot V_{cs}$ where $B_{48}$ is "1". The central controller 240 reads $B_{47}$ from the step compensatory memory 47 and stores in the charge voltage register 47 $B_{47}\cdot V_{c39}=B_{47}\cdot(V_{cs}/48\times 47)$ whereafter it reads $B_{46}$ from the step compensatory memory 46 and stores in the charge voltage register 46 $B_{46}\cdot V_{c38}=B_{46}\cdot(V_{cs}/48\times 46)$. After a series of similar operations, the controller 240 finally reads $B_9$ from the step compensatory memory 9 and stores in the charge voltage register 9 $B_9\cdot V_{c1}=B_9\cdot(V_{cs}/48\times 9)$. This completes the adjustment of deflection amount or charge voltage setting operation.

During printing on the other hand, the central controller 240 successively produces and latches the data stored in the charge voltage registers 9–48 in synchronism with the formation of each ink droplet. After the charge voltage register 48, the central controller goes back to the charge voltage register 9 and then circulates through the other register in the same way.

Hereinafter will be described other embodiments and modifications of the present invention. To summarize the first embodiment shown in FIG. 1*a*, a multi-nozzle head is utilized which has 42 ink ejection holes at common spacings of 5 mm to cover the entire width of a recording sheet. Each ejection hole is used to record data over a range of 5 mm with 40 dots (8 dots per mm). The head also has a single ink ejection hole for monitoring calibrated to eject ink under the same conditions as the 42 recording holes. Ink from this monitoring hole is constantly charged by a voltage which deflects it to the maximum deflection position (the 40th step of charging voltage). The deflected position of monitoring ink droplets is detected and, first, the charging voltage is adjusted so that the deflected position coincides with a predetermined point. If the position is out of an adjustable range, the pressure of the ink is varied. Based on the adjusted charging voltage, charging voltages (40 steps) for recording droplets are determined. A charge signal generator (FIG. 1*b*) for charging monitoring ink droplets is independent of a charge signal generator for recording ink droplets (42 generators having the construction shown in FIG. 1*c* or 1*d*).

Figures 1, 1B, 2, 3:
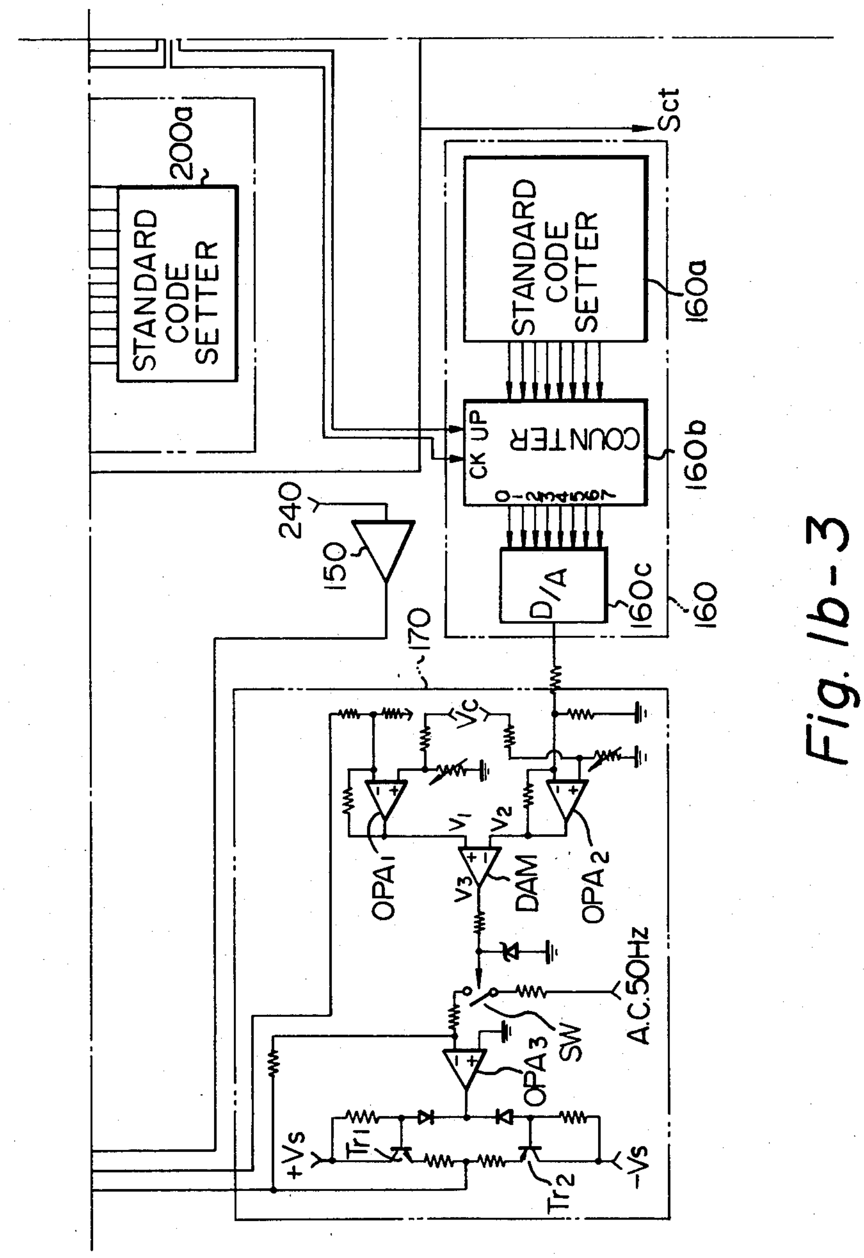
FIG. 3 is a block diagram showing a modified form of a charge voltage generator.

However, an ink jet recording apparatus may alternatively have a single nozzle head, or one deflection detecting electrode 80*a* for each of the recording ejection ports, or one or plural ink ejection ports for common use in ejecting recording ink and monitoring ink. In any of these cases, a single charge signal generator is usable for both monitoring and charging for recording. An example of such an arrangement is illustrated in FIG. 3. A charge signal generator 200″ shown in FIG. 3 additionally includes a data selector 200*e* intervening between the counter 200*b* and the third group of AND gates $AG_3$. The data selector 200*e* receives at a terminal A the output count codes of the counter 200*b* and at an other input terminal B the output codes $S_{cc}$ of the central controller 240 indicative of the set charge voltages $V_{a1}-V_{a40}$. With this alternative design, the central controller 240 will supply the data selector 200*e* with a signal for designating the input terminal A during phase search and deflection adjustment and with a signal designating the other input terminal B during actual printing action. Thus, the data selector 200*e* serves as a data selecting or switching means.

As will be noted, the charge detecting electrodes 40*a*$_i$, 40*a*$_m$ and charge detector 210 installed in the embodiment shown in FIGS. 1*a*–1*c* may be omitted. Without these components, the controller 240 in the phase search (FIG. 2*b*) will close the relays RL of the deflection detectors 220*a*–220*c* a moment after clearing the counter 190*d* and then start counting the droplets of ink formed. As this count reaches a predetermined value, the controller 240 will check the output levels of the deflection detectors 220*a*–220*c* and, if one of said output levels is "1", complete the phase search but, if all of said output levels are "0", it will reset the deflection detectors 220*a*–220*c* and feed one pulse to the counter 190*d*. Such a procedure will be repeated until one of the output levels of the deflection detectors 220*a*–220*c* becomes "1".

Furthermore, while the described embodiments alter the target ink pressure by one step every time the charging voltage misses a predetermined adjustable range, the target ink pressure may be varied by one step when the difference between the voltages $V_{m40}$ and $V_{c40}$ is larger than a reference value or it may be varied by a given amount correlated with a difference between the voltages $V_{m40}$ and $V_{c40}$ when said difference is larger than a reference value.

In the foregoing embodiments, actual measurement is made of the relation between the charge voltage and deflection amount of ink droplets ejected from one monitoring ejection hole and, based on this relation, the charge voltages $V_{c1}-V_{40}$ for the 1st to 40th levels of deflection. These charge voltages $V_{c1}-V_{40}$ are used to charge ink droplets ejected from the other recording ejection holes. It may be pointed out, however, that in a microscopic view the ejection characteristic differs from one ejection hole to another or the charging characteristic differs from one charging electrode to another. A preferable form of the present invention for coping with such irregularity in characteristics is as follows.

Droplets of ink from all of the ejection holes have their deflected positions at the 40th level measured actually and the optimum charge voltages for ink droplets from the recording ejection holes are also measured actually relative to the optimum charge voltage for droplets from the monitoring ejection hole. In this way, compensatory coefficients $A_i$ for the individual ejection holes are determined and stored in a read-only memory. A random access memory has multiple sets of charge voltage registers 9–48 in one-to-one correspondence with the ejection holes, each register storing the monitoring charge voltages $V_{c1}-V_{c40}$ multiplied by the compensatory coefficients $A_i$. In the flow of the "charge voltage code output", the product $A_i \cdot V_{ci}$ is produced and latched for each ejection hole every time a droplet is formed out of the ink column and, thus the respective charging electrodes 20$_i$ are supplied with different voltages.

Figures 1, 1B, 2, 3, 4:
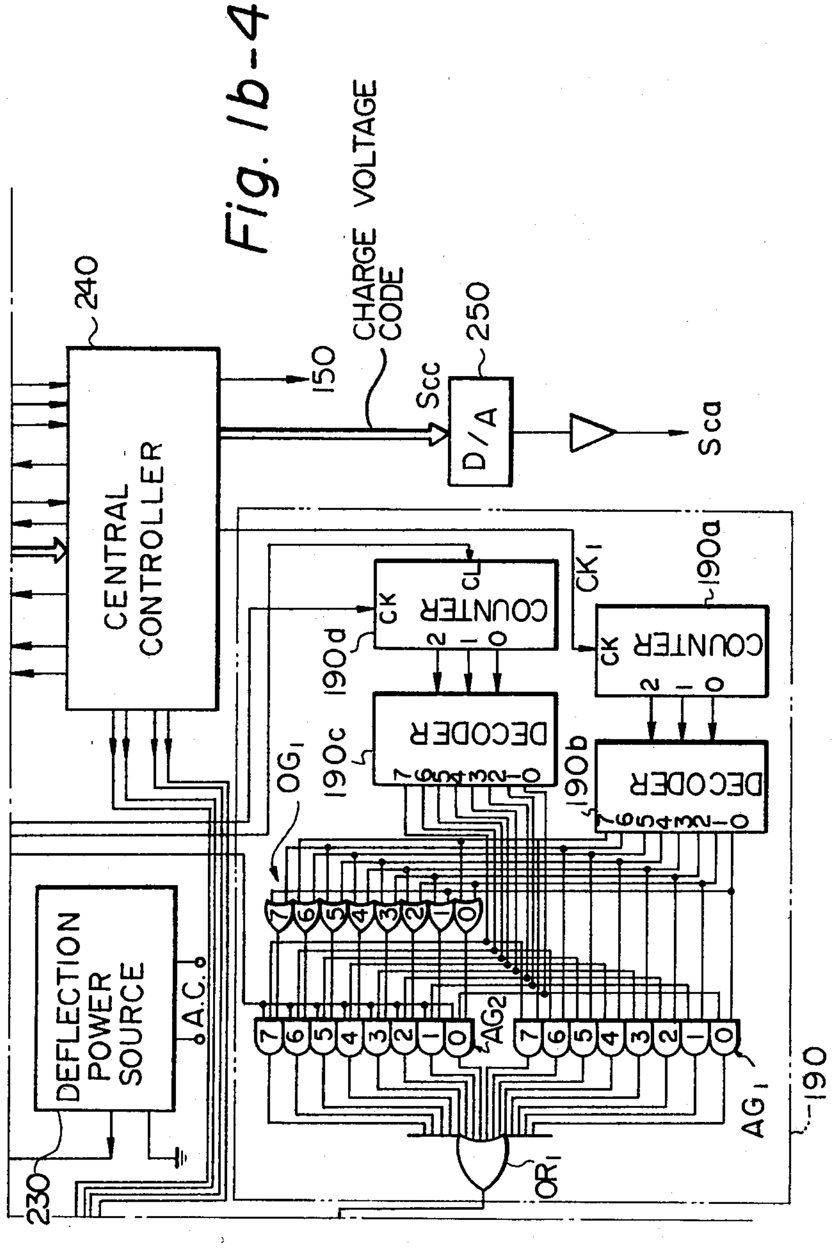
FIG. 4 shows a modified arrangement of the charge detecting electrodes.

While the charging voltages $v_{ci}$ have been determined using an equation $V_{ci}=KX_{di}$, it may be obtained by an equation $V_{ci}=KX_{di}+A$ by selecting a constant A ($\neq 0$) in accordance with the ink temperature or pressure or the ejection characteristics of the ink ejection holes. K and A of the equation $V_{ci}=KX_{di}+A$ may be determined by actual measurement at two different points instead of selecting a constant A. In this case, as illustrated in FIG. 4 for example, two sets of deflection detecting electrodes (80*a*$_1$–80*c*$_1$) and (80*a*$_2$–80*c*$_2$) may be employed and adequate deflection (impingement on the electrodes 80*a*$_1$ and 80*a*$_2$) detected at each electrode set. Charging voltages $V_{cs1}$ and $V_{cs2}$ of that instant will be processed together with the proper deflection position at the individual sets (e.g. the 40th and 16th steps) according to an equation $V_{ci}=KX_{di}+A$ to determine K and A and thereby $V_{ci}$.

Figure 5:
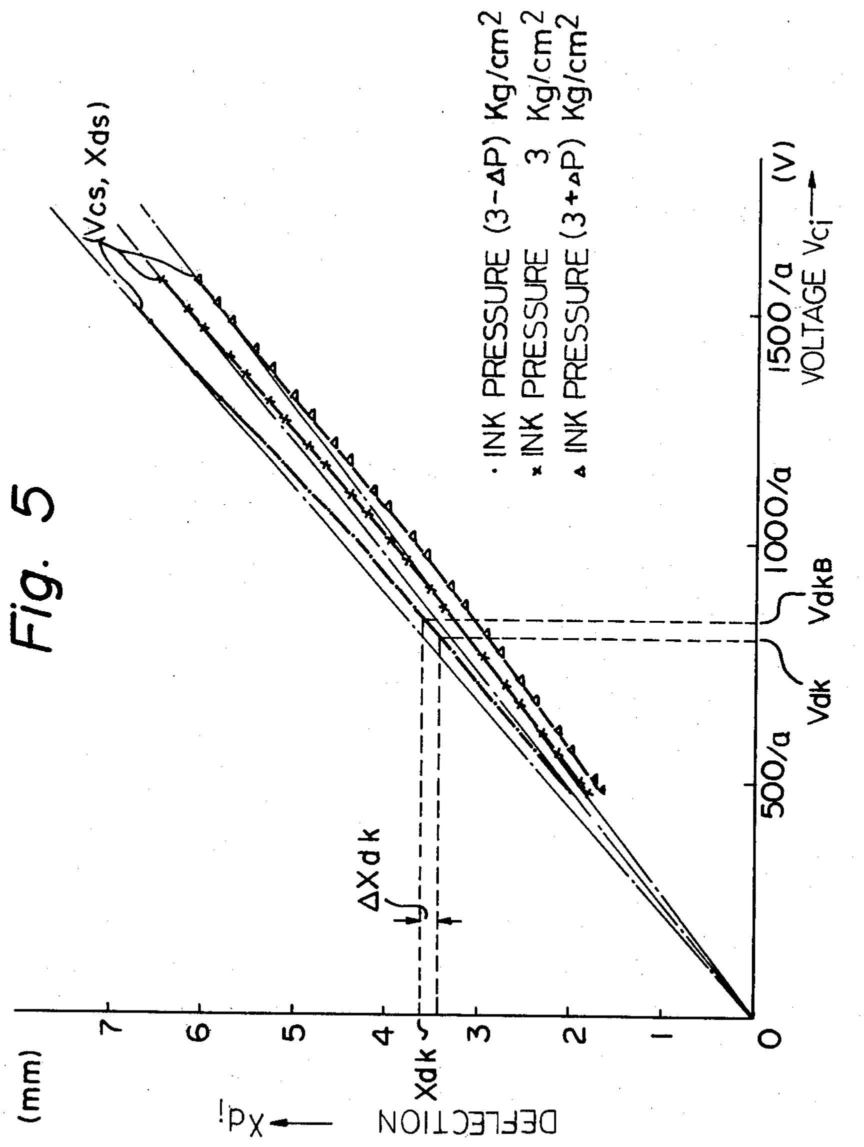
FIG. 5 is a graph to help explain the relationship between the deflecting position and charging voltage.

The present inventor found through actual measurement that the relation between $V_{ci}$ and $X_{di}$ shows a considerable shift from linearity when multi-value deflection employs a number of deflection steps. Indeed, nine to twelve deflection steps hold the non-linearity unnoticeable but thirty-two to forty deflection steps make the non-linearity conspicous and build up a slight curvature. The amount of deflection is related with the charging voltage as shown in FIG. 5. The lines indicating this relation are somewhat dislocated from the lines connecting the maximum deflection points ($V_{cs}$, $X_{ds}$) with the origin (0, 0) and resemble quadratic curves or hyperbolas rather than straight lines. To obtain K of the equation $V_{ci}=KX_{di}$ by measurement at one point such as ($V_{cs}$, $X_{ds}$) in FIG. 5 and determine a charging voltage $V_{ci}$ for another deflection with $V_{ci}=KX_{di}$ is to obtain a charging voltage $V_{ci}$ providing the deflection amount $X_{di}$ based on the dot-and-dash line of FIG. 5. A substantial deviation ($\Delta X_{dk}$) is unavoidable in practice particularly at a deflecton amount (e.g. $X_{dk}$) remote from ($V_{cs}$, $X_{ds}$). This is because not the expected charging voltage $V_{dkB}$ but the unexpected charging voltage $V_{dk}$ is applied for the deflection $X_{dk}$. With this in view, the present invention first determines at individual deflection step (e.g. deflection steps 1–40) the ratio $B_i$ of the charging voltage ($V_{dkB}$) to be actually supplied to the charging voltage ($V_{dk}$) obtainable through a theoretical proportion. This ratio $B_i$ or $V_{dkB}/V_{dk}$ is multiplied by a charging voltage $V_{ci}$ provided by theoretical proportion and the product $B_i \cdot V_{ci}$ is actually applied to a charging electrode. Concerning the deflection $X_{dk}$ for instance, $B_k = V_{dkB}/V_{dk}$ is known in advance and K of the equation $V_{ci} = KX_{di}$ is determined by actual measurement at one point ($V_{cs}$, $X_{ds}$) whereupon this equation is used to obtain $V_{dk}$ by an equation $V_{dk} = KX_{dk}$ and this $V_{dk}$ is multiplied by $B_k$ to provide a charging voltage $B_k \cdot V_{dk} = (V_{dkB}/V_{dk}) \times V_{dk} = V_{dk}$ which will be applied to a charging electrode. A more preferable procedure consists in actually measuring the relation between the charging voltage and deflection amount at two points, or three points if necessary, to obtain it in the form of an equation of quadratic curve or hyperbola, determining the constant of said equation, that is, determining the constant of an equation $X_{di} = K(1/V_{ci})$ or $X_{di} = a\,V_{ci}^2 + b\,V_{ci} + C$ or setting a constant in accordance with the conditions, and obtaining $V_{ci}$ from said equation. Any of the procedures mentioned can be performed easily by a microcomputer.

While the present invention has been shown and described in connection with specific constructions and arrangements, they are not for restrictive purpose but only for illustrative purpose and various other constructions and arrangements are possible. For example, the counter 160*b* and standard code setter 160*a* of the pressure setting circuit 160 and the counter 260*b* and standard code setter 260*a* of the voltage setting circuit may be omitted altogether and their functions may be allotted to the microcomputer of the controller 240 for instance. The same holds true concerning the counter 200*b*, standard code setter 200*a*, second group of AND gates $AG_3$ and data selector 200*e* included in the charge signal generator 200. Additionally, the microcomputer may take charge of the function of the phase setting circuit 190.

Moreover, use may be made of an ink jet head of any other single nozzle type or multi-nozzle type in place of the head 10 shown in FIG. 1*a*. An example is a head having a plurality of cylindrical electrostrictive vibrators which are common in number to the nozzles and each having one ink ejection port at its leading end while being communicated with a common ink passage of the head at one end thereof. Another example is a head having cylindrical electrostrictive vibrators which are spaced from a pressurized ink box and communicated therewith by pipes and mounted on a fixed support or an ejection direction adjusting base.

In summary, the present invention provides an ink jet recording apparatus which carries out quick yet accurate compensation for misdeflection by detecting the deflected positions of ink droplets and thereby adjust and set the whole charging voltages. The pressure of ink is altered only when the charging voltages miss an adjustable range and, hence, the probability and frequency of ink pressure variation are minimized. The amount of ink pressure change is small if needed so that a change in the density of ink attributable to the change in the pressure is small facilitating printing of data with exact dot arrangement. The charging voltage levels which determine amounts of deflection are individually set on the basis of actual charging voltages which drive droplets along determined paths and, therefore, in accordance with the printing characteristic at each instant. This promotes stable printing always with least dislocation of dots on a sheet and thereby eliminates drawbacks inherent in a conventional fixed charging voltage system such as that fluctuation of the ejection characteristic causes distortion to printed data if determined charging voltages are used.

Various modifications will become possible for those skilled in the art after receiving the teachings of the present disclosure without departing from the scope thereof.

What is claimed is:

1. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1 = K_1Xd_1$;

second computing means for computing charging voltages ($Vc_i$) applied to the ink jet deflected by the deflecting means so as to reach deflection positions ($Xd_i$) from an equation of $Vc_i = K_1Xd_i$ where i is the number of the steps of deflection; and control means for controlling the charging means to electrostatically charge the ink jet in accordance with the computed charging voltages ($Vc_i$).

2. An ink jet recording apparatus as claimed in claim 1, further comprising second reference charging voltage detecting means for detecting a second reference charging voltage ($Vc_2$) applied to the ink jet which is deflected by the deflecting means so as to reach a second predetermined deflection position ($Xd_2$), said first computing means being constructed to compute a second coefficient ($K_2$) from an equation of $Vc_2 = K_2Xd_2$, said second computing means being constructed to compute the charging voltages ($Vc_i$) in accordance with both the equation of $Vc_i = K_1Xd_i$ and the equation of $Vc_i = K_2Xd_i$.

3. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1 = K_1Xd_1$;

second computing means for computing charging voltages ($Vc_i$) applied to the ink jet deflected by the deflecting means so as to reach deflection positions ($Xd_i$) from an equation of $Vc_i = K_1Xd_i$ where i is the number of the steps of deflection;

control means for controlling the charging means to electrostatically charge the ink jet in accordance with the computed charging voltages ($Vc_i$); and third computing means for computing variable parameter ($A_1$), said second computing means being constructed to compute the charging voltages ($Vc_i$) from an equation of $Vc_i=K_1Xd_i+A_1$.

4. An ink jet recording apparatus as claimed in claim 3, in which said parameter comprises at least one of ink pressure and temperature.

5. An ink jet recording apparatus as claimed in claim 2, further comprising second reference charging voltage detecting means for detecting a second reference charging voltage ($Vc_2$) applied to the ink jet which is deflected by the deflecting means so as to reach a second determined deflection position ($Xd_2$), said third computing means being constructed to compute variable parameter ($A_2$), said first computing means being constructed to compute a second coefficient ($K_2$) from an equation of $Vc_2=K_2Xd_2+A_2$, said second computing means being constructed to compute the charging voltages ($Vc_i$) in accordance with both the equation of $Vc_i=K_1Xd_i+A_1$ and an equation of $Vc_i=K_2Xd_i+A_2$.

6. An ink jet recording apparatus as claimed in claim 5, in which said second computing means is constructed to compute an equation of $A_iVc_i$ where $A_i$ is indicative of nozzle compensatory coefficients which are determined by inherent ejection characteristics of the nozzles of the ink jet head.

7. An ink jet recording apparatus as claimed in claim 2, in which said second computing means is constructed to compute an equation of $A_iVc_i$ where $A_i$ is indicative of nozzle compensatory coefficients which are determined by inherent ejection characteristics of the nozzles of the ink jet head.

8. An ink jet recording apparatus as claimed in claim 5, in which said second computing means is constructed to compute an equation of $B_iVc_i$ where $B_i$ is indicative of step compensatory coefficients which are determined by difference between the amounts of deflection force to eject the ink jet to reach different deflection positions.

9. An ink jet recording apparatus as claimed in claim 7, in which said second computing means is constructed to compute an equation of $B_iA_iVc_i$ where $B_i$ is indicative of step compensatory coefficients which are determined by difference between the amounts of deflection force to eject the ink jet to reach different deflection positions.

10. An ink jet recording apparatus as claimed in claim 6, in which said second computing means is constructed to compute an equation of $B_iA_iVc_i$ where $B_i$ is indicative of step compensatory coefficients which are determined by difference between the amounts of deflection force to eject the ink jet to reach different deflection positions.

11. An ink jet recording apparatus as claimed in claim 2, in which said second computing means is constructed to compute an equation of $B_iVc_i$ where $B_i$ is indicative of step compensatory coefficients which are determined by difference between the amounts of deflection force to eject the ink jet to reach different deflection positions.

12. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1=K_1Xd_1$;

second computing means for computing charging voltages ($Vc_i$) applied to the ink jet deflected by the deflecting means so as to reach deflection positions ($Xd_i$) from an equation of $Vc_i=K_1Xd_i$ where i is the number of the steps of deflection; and control means for controlling the charging means to electrostatically charge the ink jet in accordance with the computed charging voltages ($Vc_i$);

said second computing means being constructed compute an equation of $A_iVc_i$ where $A_i$ is indicative of nozzle compensatory coefficients which are determined by inherent ejection characteristics of the nozzles of the ink jet head.

13. An ink jet recording apparatus as claimed in claim 12, in which said second computing means is constructed to compute an equation of $B_iA_iVc_i$ where $B_i$ is indicative of step compensatory coefficients which are determined by difference between the amounts of deflection force to eject the ink jet to reach different deflection positions.

14. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1=K_1Xd_1$;

second computing means for computing charging voltages ($Vc_i$) applied to the ink jet deflected by the deflecting means so as to reach deflection positions ($Xd_i$) from an equation of $Vc_i=K_1Xd_i$ where i is the number of the steps of deflection;

control means for controlling the charging means to electrostatically charge the ink jet in accordance with the computed charging voltages ($Vc_i$); and second reference charging voltage detecting means for detecting a second reference charging voltage ($Vc_2$) applied to the ink jet which is deflected by the deflecting means so as to reach a second predetermined deflection position ($Xd_2$), said first computing means being constructed to compute a second coefficient ($K_2$) from an equation of $Vc_2=K_2Xd_2$, said second computing means being constructed to compute the charging voltages ($Vc_i$) in accordance with both the equation of $Vc_i=K_1Xd_1$ and the equation of $Vc_i=K_2Xd_i$;

said second computing means being constructed to compute an equation of $A_iVc_i$ where $A_i$ is indicative of nozzle compensatory coefficients which are determined by inherent ejection characteristics of the nozzles of the ink jet head.

15. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1=K_1Xd_1$;

second computing means for computing charging voltages ($Vc_i$) applied to the ink jet deflected by the deflecting means so as to reach deflection positions ($Xd_i$) from an equation of $Vc_i=K_1Xd_i$ where i is the number of the steps of deflection; and control means for controlling the charging means to electrostatically charge the ink jet in accordance with the computed charging voltages ($Vc_i$);

said second computing means being constructed to compute an equation of $B_iVc_i$ where $B_i$ is indicative of step compensatory coefficients which are determined by difference between the amounts of deflection force to eject the ink jet to reach different deflection positions.

16. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1=K_1Xd_1$;

second computing means for computing charging voltages ($Vc_i$) applied to the ink jet deflected by the deflecting means so as to reach deflection positions ($Xd_i$) from an equation of $Vc_i=K_1Xd_1$ where i is the number of the steps of deflection;

control means for controlling the charging means to electrostatically charge the ink jet in accordance with the computed charging voltages ($Vc_i$); and second reference charging voltage detecting means for detecting a second reference charging voltage ($Vc_2$) applied to the ink jet which is deflected by the deflecting means so as to reach a second predetermined deflection position ($Xd_2$), said first computing means being constructed to compute a second coefficient ($K_2$) from an equation of $Vc_2=K_2Xd_2$, said second computing means being constructed to compute the charging voltages ($Vc_i$) in accordance with both the equation of $Vc_i=K_1Xd_i$ and the equation of $Vc_i=K_2Xd_i$;

said second computing means being constructed to compute an equation of $B_iVc_i$ where $B_i$ is indicative of step compensatory coefficients which are determined by difference between the amounts of deflection force to eject the ink jet to reach different deflection positions.

17. An ink jet recording apparatus including an ink ejection head having a plurality of nozzles each for ejecting a jet of ink, charging means for electrostatically charging the ink jet, and deflecting means for electrostatically deflecting the charged ink jet, characterized by comprising:

reference charging voltage detecting means for detecting a reference charging voltage ($Vc_1$) applied to the ink jet which is deflected by the deflecting means so as to reach a predetermined deflection position ($Xd_1$);

first computing means for computing a coefficient ($K_1$) from the relationship between the reference charging voltage ($Vc_1$) and the predetermined deflection position ($Xd_1$) which is defined by an equation of $Vc_1=K_1Xd_1$;

second computing means for computing charging voltages ($Vc_i$) applied to the ink jet deflected by the deflecting means so as to reach deflection positions ($Xd_i$) from an equation of $Vc_i=K_1Xd_i$ where i is the number of the steps of deflection;

control means for controlling the charging means to electrostatically charge the ink jet in accordance with the computed charging voltages ($Vc_i$); and second reference charging voltage detecting means for detecting a second reference charging voltage ($Vc_2$) applied to the ink jet which is deflected by the deflecting means so as to reach a second predetermined deflection position ($Xd_2$), said first computing means being constructed to compute a second coefficient ($K_2$) from an equation of $Vc_2=K_2Xd_2$, said second computing means being constructed to compute the charging voltages ($Vc_i$) in accordance with both the equation of $Vc_i=K_1Xd_i$ and the equation of $Vc_i=K_2Xd_i$;

said second computing means being constructed to compute an equation of $A_iVc_i$ where $A_i$ is indicative of nozzle compensatory coefficients which are determined by inherent ejection characteristics of the nozzles of the ink jet head;

said second computing means being constructed to compute an equation of $B_iA_iVc_i$ where $B_i$ is indicative of step compensatory coefficients which are determined by difference between the amounts of deflection force to eject the ink jet to reach different deflection positions.

* * * * *